US008710375B2

(12) United States Patent
Moriwaki

(10) Patent No.: US 8,710,375 B2
(45) Date of Patent: Apr. 29, 2014

(54) DISPLAY DEVICE SUBSTRATE, METHOD FOR MANUFACTURING THE SAME, DISPLAY DEVICE, METHOD FOR FORMING MULTI-LAYER WIRING, AND MULTI-LAYER WIRING SUBSTRATE

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 673 days.

(21) Appl. No.: 12/920,849

(22) PCT Filed: Oct. 29, 2008

(86) PCT No.: PCT/JP2008/069689
§ 371 (c)(1),
(2), (4) Date: Sep. 3, 2010

(87) PCT Pub. No.: WO2009/110136
PCT Pub. Date: Sep. 11, 2009

(65) Prior Publication Data
US 2011/0000705 A1 Jan. 6, 2011

(30) Foreign Application Priority Data

Mar. 4, 2008 (JP) ................................. 2008-053779

(51) Int. Cl.
*H05K 3/36* (2006.01)
*H01K 3/10* (2006.01)
(52) U.S. Cl.
USPC ............................... 174/262; 29/830; 29/852
(58) Field of Classification Search
USPC ............. 174/262–266; 361/792–795; 29/830, 29/852–853
See application file for complete search history.

(56) References Cited

U.S. PATENT DOCUMENTS

| | | | |
|---|---|---|---|
| 7,671,958 B2 * | 3/2010 | Fujita | 349/152 |
| 2003/0168966 A1 | 9/2003 | Kobayashi et al. | |
| 2004/0056589 A1 | 3/2004 | Yamazaki et al. | |
| 2005/0109533 A1 * | 5/2005 | Kurashina et al. | 174/255 |
| 2005/0112408 A1 | 5/2005 | Kobayashi et al. | |
| 2005/0213046 A1 * | 9/2005 | Teijido et al. | 353/31 |
| 2007/0087488 A1 | 4/2007 | Moriwaka | |
| 2008/0117132 A1 * | 5/2008 | Kimura | 345/60 |

FOREIGN PATENT DOCUMENTS

| | | |
|---|---|---|
| CN | 1492723 A | 4/2004 |
| CN | 1496543 A | 5/2004 |
| JP | 3-58019 A | 3/1991 |
| JP | 3-183756 A | 8/1991 |
| JP | 2005-352498 A | 12/2005 |
| JP | 2007-288127 A | 11/2007 |

* cited by examiner

Primary Examiner — Jeremy Norris
(74) Attorney, Agent, or Firm — Birch, Stewart, Kolasch & Birch, LLP

(57) ABSTRACT

The present invention provides a display device substrate that enables microfabrication of lines and is capable of reducing faulty connection and enhancing the reliability of display devices including the display device substrate, a method for producing the display device substrate, a display device, a method for forming a multilayer wiring structure, and a multilayer wiring board. The display substrate of the present invention includes an insulating substrate and includes at least one of a terminal area having a connection terminal to be connected to an external connection component and a peripheral circuit region having a peripheral circuit formed thereon, on the insulating substrate. The display device substrate includes an organic insulating film and an inorganic insulating film, and the inorganic insulating film is stacked directly on and above the organic insulating film such that an organic-inorganic film stacked body is formed.

27 Claims, 26 Drawing Sheets (a)

(b)

Fig. 8-1
(a)
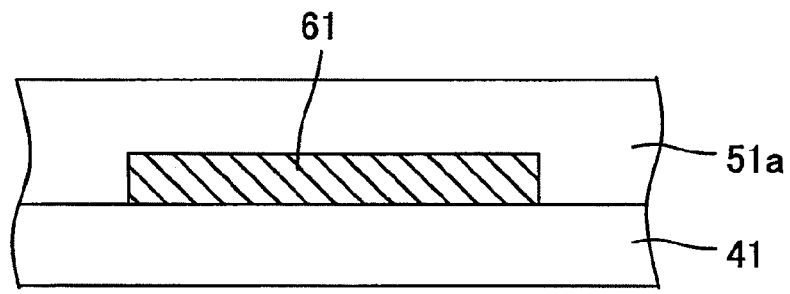
(b)
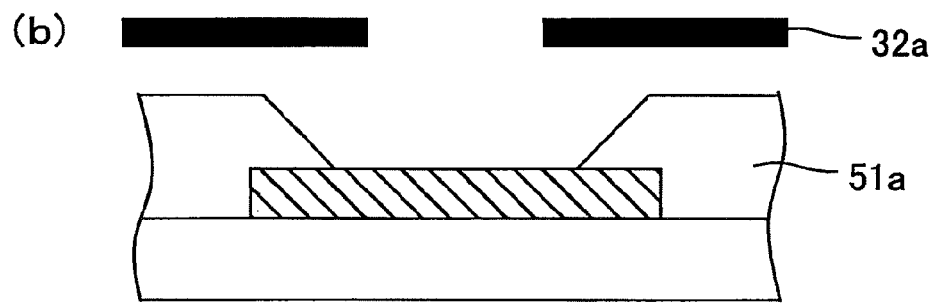
(c)
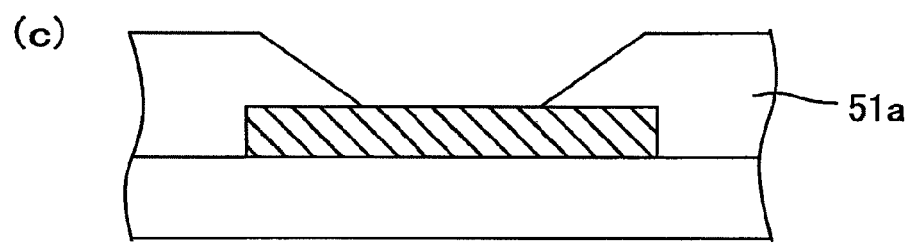
(d)
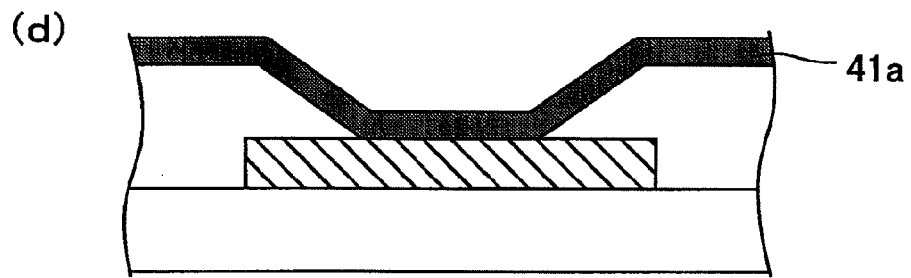

Fig. 8-2
(e)
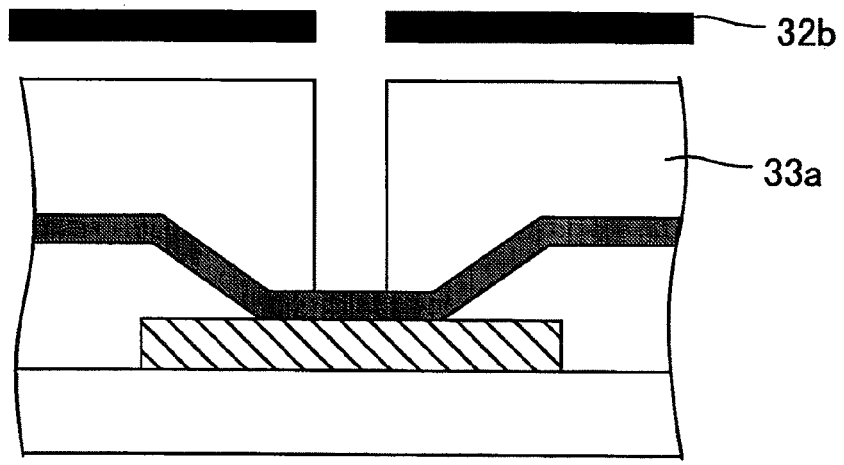
(f)
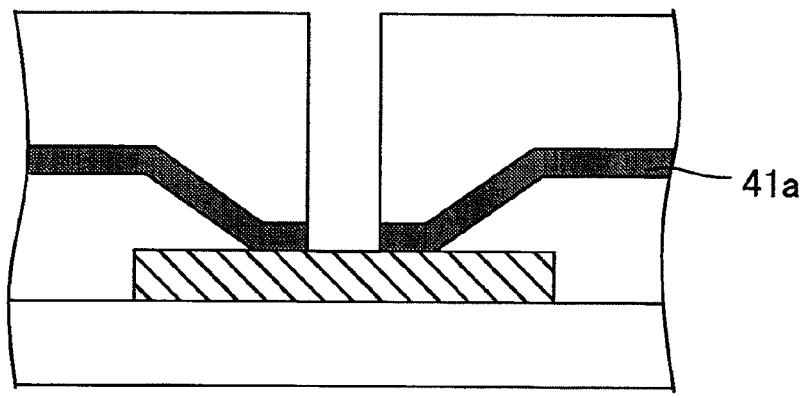
(g)
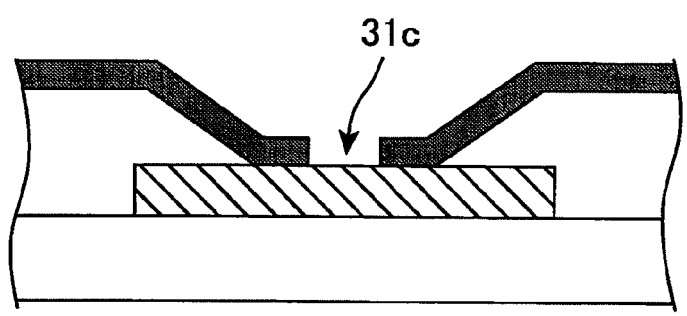

Fig. 9-1
(a)
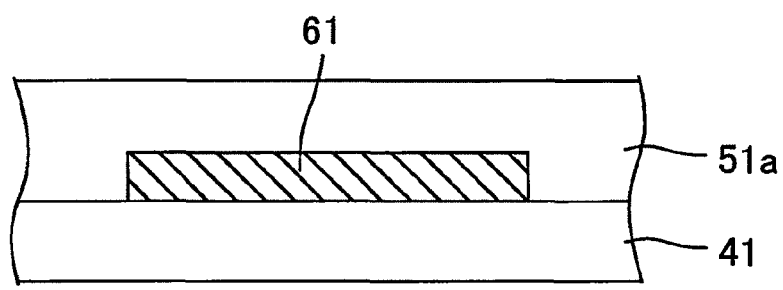
(b)
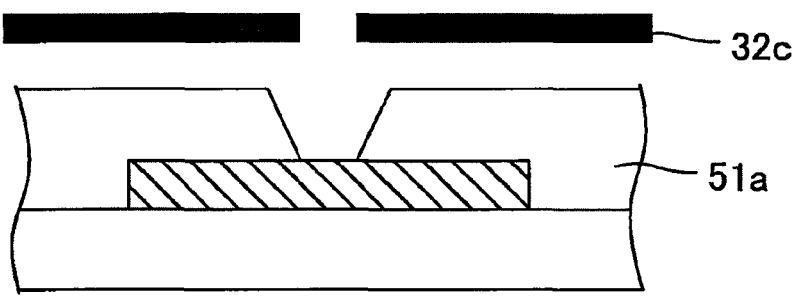
(c)
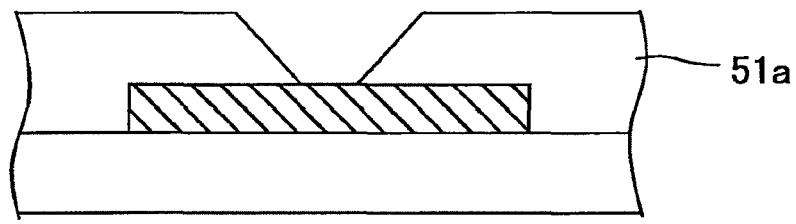
(d)
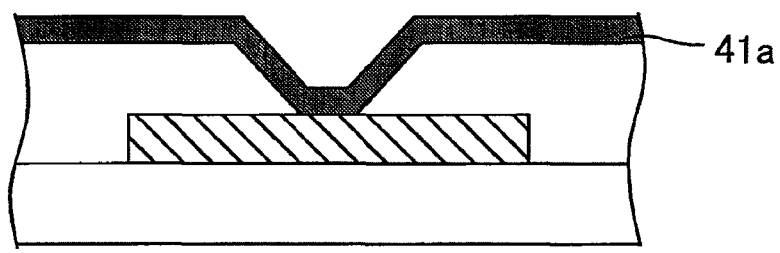

Fig. 9-2
(e) 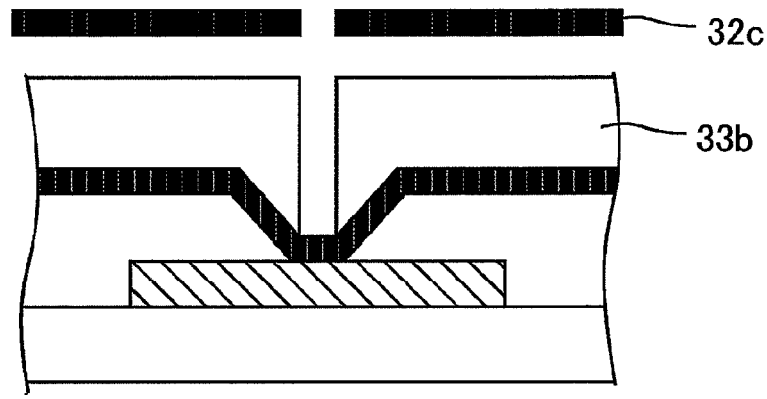
(f) 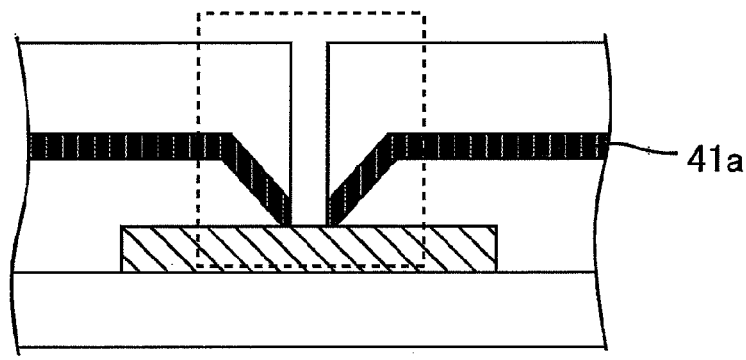
(g) 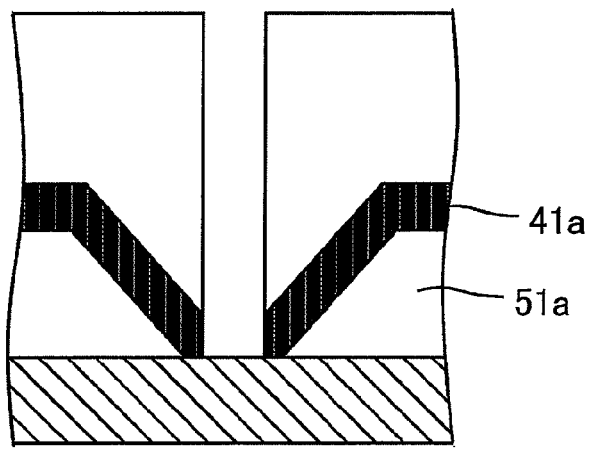
(h) 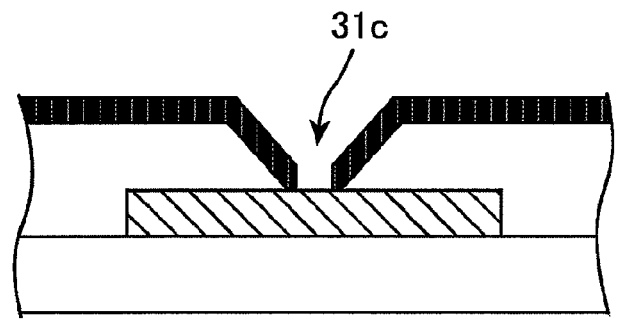

Fig. 10-1
(a)
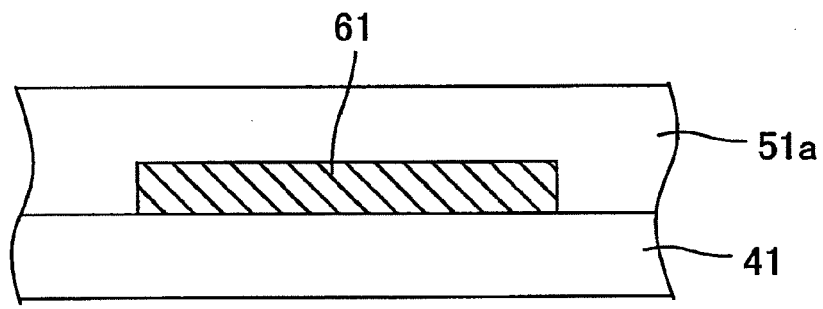
(b)
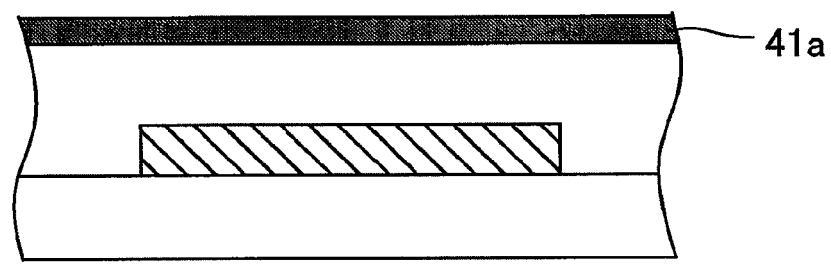
(c)
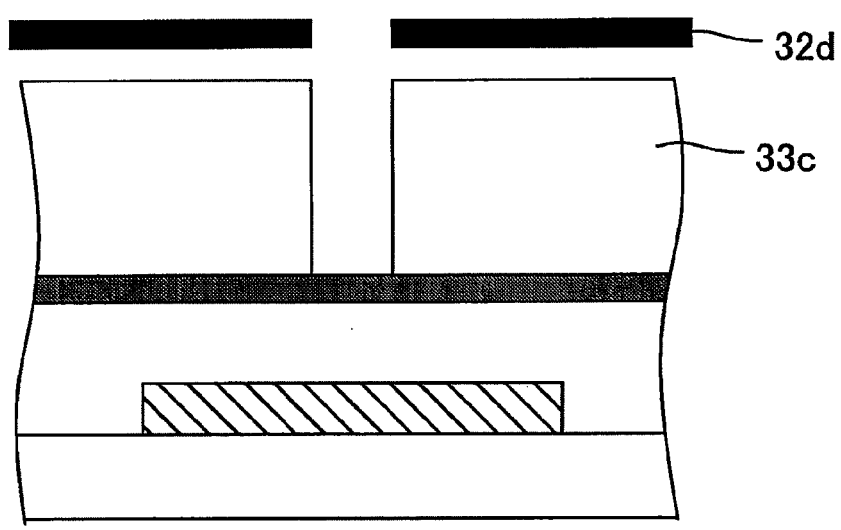

Fig. 10-2
(d)
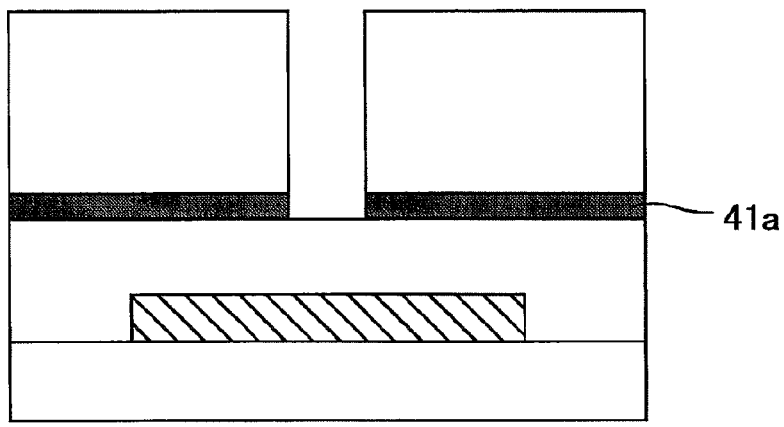
(e)
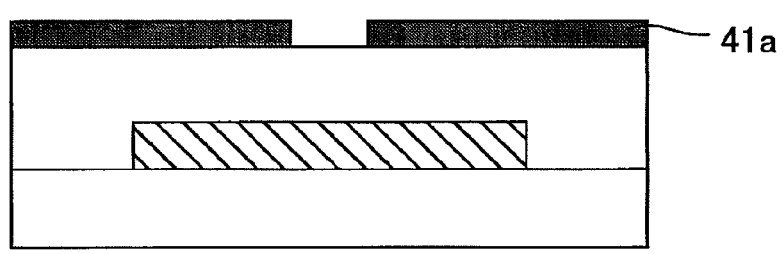
(f)
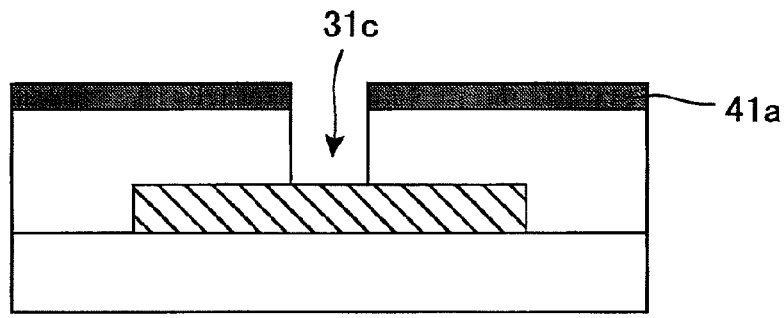

(a)

(b)

(a)

(b)

(a)

(b)

DISPLAY DEVICE SUBSTRATE, METHOD FOR MANUFACTURING THE SAME, DISPLAY DEVICE, METHOD FOR FORMING MULTI-LAYER WIRING, AND MULTI-LAYER WIRING SUBSTRATE

TECHNICAL FIELD

The present invention relates to a display device substrate, a method for producing the display device substrate, a display device, a method for forming a multilayer wiring structure, and a multilayer wiring board. More specifically, the present invention relates to a display device substrate of a multilayer wiring structure having a terminal area with a connection terminal to be connected to an FPC or the like, a method for producing the display device substrate, a display device, a method for forming a multilayer wiring structure, and a multilayer wiring board. In the display device substrate, lines of a multilayer structure extend, for example, around lower layers of the terminal area and peripheral circuits, which are in a frame region, and circuits in a pixel region. This structure allows a narrow frame design of a panel and formation of a pixel memory and the like on the display device substrate as well as a high level of integration. The display device substrate is suitably used in liquid crystal display panels and organic electroluminescent display panels.

BACKGROUND ART

In recent years, there has been a growing need for further reducing the size and weight of portable electronic devices mounted with, for example, a liquid crystal display device or an organic electroluminescent display device (OEC display), such as cellular phones and PDAs. A trend, therefore, has been toward reducing the size of regions around display regions, that is, narrow frames, and studies have been intensively carried out to achieve it. Another trend has focused attention on display devices having a full-monolithic display device substrate, which can be designed to be thinner and produced at low cost, and these display devices having a full-monolithic display device substrate have been increasingly produced. The full-monolithic display device substrates are substrates having a peripheral circuit integrally formed thereon for driving a driver circuit or the like.

FIG. 7 are cross-sectional views schematically illustrating a frame region of a conventional liquid crystal display device. FIG. 7 (*a*) illustrates a terminal area, and FIG. 7 (*b*) illustrates a peripheral circuit region. In the terminal area of the conventional liquid crystal display device 600, as shown in FIG. 7 (*a*), a TFT substrate 111, which is a display device substrate, and an FPC board 170 are connected through an ACF 180.

In the terminal area, as shown in FIG. 7 (*a*), The TFT substrate 111 includes an insulating substrate 121, a base coat film 122, a gate insulating film 124, gate electrodes 125, an inorganic insulating film 141 serving as an interlayer insulating film, a connection terminal (external connection terminal) 126 in a first wiring layer 161, and an organic insulating film 151*a* serving as a protective film, and these components are stacked in this order from the insulating substrate 121. A pad 127 is provided on an end portion of the connection terminal 126.

In the peripheral circuit region, as shown in FIG. 7 (*b*), the TFT substrate 111 includes the insulating substrate 121, the base coat film 122, a semiconductor layer 123, the gate insulating film 124, the gate electrode 125, the inorganic insulating film 141 serving as an interlayer insulating film, source/drain electrodes 128 and extending lines 130*a* in the first wiring layer 161, the organic insulating film 151*a* serving as an interlayer insulating film, extending lines 130*b* in a second wiring layer 162, and an organic insulating film 151 serving as a protective film, and these components are stacked in this order from the insulating substrate 121.

A structure in which a well-planarized organic insulating film like the organic insulating film 151*a* is formed as a planarizing film has been proposed as a technique to reduce irregularity caused by layers at lower levels than the organic insulating film, such as the first wiring layer 161 and the TFT 129, and to prevent short circuits of lines at upper levels than the organic insulating film, such as the lines in the second wiring layer 162, even if the lines are extended.

For example, Patent Document 1 discloses a display device in which an aluminum film used for a wiring in the inside of a panel (i.e. in a pixel region or a display region) is connected in the inside of the panel to a metal film at a lower level than the aluminum film and the metal film is extended outward from the panel with the metal film.

Patent Document 2 discloses a technique for semiconductor devices, which is a method for forming a multilayer wiring structure including: forming through holes in an insulating film; covering the through holes with an organic film before removal of a resist; performing an $O_2$ plasma treatment; and performing a treatment with a resist removing solution to remove the organic film covering the through holes as well as the resist. This technique was established to reduce damage to the wall surfaces of the through holes in the interlayer insulating film in the $O_2$ plasma treatment and therefore to avoid an increase in hygroscopicity caused by such damage. This technique also aims to prevent faulty contact between first lines at a lower level than the interlayer insulating film and second lines at an upper level than the interlayer insulating film, and to reduce electromigration of the second lines caused by surface irregularity.

[Patent Document 1]
  Japanese Kokai Publication No. Hei-3-58019
[Patent Document 2]
  Japanese Kokai Publication No. Hei-3-183756

DISCLOSURE OF INVENTION

If a method including processing using a resist mask such as dry-etching which enables precise microfabrication is used to form a contact hole (via hole) 131*c* shown in FIG. 7(*b*) in the organic insulating film 151*a* instead of a method including photoetching that does not require a resist mask, a selective ratio of the resist mask to the organic insulating film 151*a* cannot be suitably selected in a process of ashing (removing) the resist mask because both of the resist mask and the organic insulating film 151*a* are organic films and the selective ratio between them is small. In this case, etching may not be performed well. Specifically, the organic insulating film 151*a* may also be possibly removed by the ashing of the resist mask. Even if only the resist mask is successfully removed by the ashing, the organic insulating film 151*a* may get damaged due to the ashing. This damage may lead to insufficient deposition of the second wiring layer 162 on the organic insulating film 151*a*, which in turn may result in faulty connection between the first wiring layer 161 and the second wiring layer 162. In order to overcome these problems, in the conventional art, a photosensitive resin has been used for the organic insulating film 151*a*, no resist mask has been used to form the contact hole 131*c*, and wet processing has been applied to pattern the second wiring layer 162 directly on and above the organic insulating film 151*a*. Thus, the conventional art should overcome the problems relating to microfabrication of lines and reduction of faulty connection between layers at different levels. Even if a planarizing film formed of an inorganic material is used instead of the organic insulating film 151a, similar problems will occur.

Panels provided with external connection terminals such as liquid crystal display panels have the following problem, which is specific to such display devices. If rework is carried out on, for example, a panel having the structure shown in FIG. 7(a) in which the organic insulating film 151a is located at the top, in a process of connecting the panel and an FPC board 170, the organic insulating film 151a tends to come off or get damaged because organic films including the organic insulating film 151a are poor in mechanical strength such as peel strength and hardness compared to inorganic films (i.e. cracks easily develop due to external pressure to organic films). From these defects, lines in a wiring layer at a lower level than the organic insulating film 151a are exposed, which may result in corrosion of the lines caused by moisture and the like, and faulty connection of the FPC board 170 caused by fragments detached from the organic insulting film 151a. Thus, the reliability should be improved. Although a structure may be possible in which the organic insulating film 151a is removed only in the terminal area such that the first wiring layer 161 is positioned at the top in the terminal area, this structure will also suffer from moisture from the outside, and therefore the reliability of the first wiring layer 161 will be low.

In view of the above-mentioned problems, the present inventor completed the present invention, and an object of the present invention is to provide a display device substrate that enables microfabrication of lines and is capable of reducing faulty connection and enhancing the reliability of display devices including the display device substrate, a method for producing the display device substrate, a display device, a method for forming a multilayer wiring structure, and a multilayer wiring board.

In order to develop a display device substrate that enables microfabrication of lines and is capable of reducing faulty connection and enhancing the reliability of a display device including the display device substrate, a method for producing the display device substrate, a display device, a method for forming a multilayer wiring structure, and a multilayer wiring board, the present inventor has conducted various studies and focused on organic insulating films used as interlayer insulating films and planarizing films. The present inventor found that organic insulating films have poor processability and mechanical strength compared to inorganic insulating films when used alone, and that a combination of an organic insulating film and an inorganic insulating film, more specifically, an organic-inorganic film stacked body in which an inorganic film is formed directly on and above an organic insulating film maintains the planar feature of the organic insulating film and has improved processability and mechanical strength. Thus, the present inventor found a way to solve the above-mentioned problems and completed the present invention.

The present invention provides a display device substrate including an insulating substrate, which includes at least one of a terminal area having a connection terminal to be connected to an external connection component and a peripheral circuit region having a peripheral circuit formed thereon, on the insulating substrate. The display device substrate includes an organic insulating film; and an inorganic insulating film, and the inorganic insulating film is stacked directly on and above the organic insulating film such that an organic-inorganic film stacked body is formed.

In this structure, the inorganic film whose mechanical strength is high can protect the organic insulating film. In this structure, the terminal area may include the organic-inorganic film stacked body, and in this case, the organic insulating film can avoid coming off or getting damaged even if rework is carried out in a process of connecting the display device substrate and an external circuit board or an element such as an FPC board. Accordingly, this structure can reduce exposure of a wiring layer at a lower level than the organic insulating film, and therefore can reduce corrosion of the wiring layer caused by moisture and the like. This structure can also reduce faulty connection between a terminal and an external connection component such as FPC caused by fragments detached from the organic insulating film. Therefore, the use of the display device substrate of the present invention can improve the reliability of display devices including the display device substrate.

The display device substrate of the present invention allows the use of a method including ashing, that is, a method including processing using a resist mask such as dry-etching which enables precise microfabrication, to form contact holes in the organic-inorganic film stacked body because the inorganic insulating film serves as a stopper during ashing a resist mask. Therefore, it is possible to precisely form microfabricated lines at lower levels than the organic-inorganic film stacked body, and particularly lines which require microfabrication, such as extending lines in the peripheral circuit region.

Faulty connection between a line in a layer at an upper level and a line in a layer at a lower level than the organic-inorganic film stacked body can be reduced because the organic insulating film is less likely to get damaged due to ashing.

The terms "upper" and "above" used herein indicate a location farther from the insulating substrate, and the terms "lower", "under" and "below" indicate a location closer to the insulating substrate. Namely, a layer at an upper level indicates a layer farther from the insulating substrate and a layer at a lower level indicates a layer closer to the insulating substrate.

The structure of the display device substrate of the present invention is not particularly limited, and the display device substrate may or may not include any other components, provided that it essentially includes the above-mentioned components. Hereinafter, the preferred embodiments of the display device substrate of the present invention are described in more detail. It should be noted that any of the embodiments described below may be applied in combination.

The display device substrate preferably includes the terminal area and the peripheral circuit region. Namely, the display device substrate preferably includes the terminal area having a connection terminal to be connected to an external connection component and the peripheral circuit region having a peripheral circuit formed thereon, on the insulating substrate. This structure can enable microfabrication of lines and can improve the reliability of display devices including the display device substrate.

The external connection component is not particularly limited, provided that it is a circuit board or an element connectable to a display panel including the display device substrate. Examples thereof include FPC (Flexible Printed Circuit) boards, TCPs (Tape Carrier Package), COGs (Chip on Glass), resistive elements, and capacitive elements. FPC boards are suitable among these.

In the display device substrate, the terminal area preferably includes the organic-inorganic film stacked body. As described above, this structure can lead to improvement of the reliability of display devices including the display device substrate.

In the display device substrate, the peripheral circuit region preferably includes the organic-inorganic film stacked body. As described above, this structure can enable formation of a peripheral circuit having a microfabricated wiring.

The display device substrate preferably includes a plurality of the organic-inorganic film stacked bodies. This structure can enable formation of a multilayer wiring.

In the display device substrate, the terminal area may include the plurality of the organic-inorganic film stacked bodies. In this case, it is preferable that the display device substrate has a plurality of wiring layers formed between the organic-inorganic film stacked bodies, and that the connection terminal is preferably formed in a wiring layer other than the wiring layer closest to the insulating substrate (lowest layer) among the plurality of wiring layers. This structure can ensure the reliability of display devices including the display device substrate and enable formation of lines below the connection terminal.

In the case where the display device substrate includes a plurality of wiring layers between the organic-inorganic stacked bodies, it is more preferable that the connection terminal is formed in a wiring layer located uppermost among the wiring layers. This structure can ensure the reliability of display devices including the display device substrate and enable formation of a larger number of wiring layers below the connection terminal.

In the display device substrate, the terminal area may or may not include a portion in which the inorganic insulating film is deposited directly on and above the connection terminal, and may or may not include the organic insulating film. These structures can particularly contribute to improvement of the mechanical reliability of display devices including the display device substrate.

More specifically, the terminal area is preferably an area on which a conductive material for connecting the display device substrate of the present invention and an external connection component are deposited. Suitable examples of the conductive material include anisotropy electric conduction materials such as ACFs (anisotropic conductive films), and suitable examples of the external connection component include circuit boards. Therefore, it is preferable that the inorganic insulating film covers the organic insulating film to prevent the organic insulating film from contacting the conductive material.

In the display device substrate, the peripheral circuit region preferably includes the plurality of the organic-inorganic film stacked bodies. This structure can enable formation of a peripheral circuit having a multilayer microfabricated wiring. The inorganic insulating film is preferably formed to cover at least the upper surface of the organic insulating film in the peripheral circuit region. In the peripheral circuit region, the inorganic insulating film may be formed to cover the whole surface of the organic insulating film except at least lower portions of the wall surfaces of holes in the organic insulating film, or may be formed to cover the whole surface of the organic insulating film including the wall surfaces of the holes in the organic insulating film.

Holes in the organic insulating film are preferably covered with a wiring layer at an upper level than the inorganic insulating film. In this case, the holes in the organic insulating film may be covered with the wiring layer at an upper level, and the other region of the organic insulating film is not covered with the wiring layer but may be covered with the inorganic insulating film. This structure can protect the organic insulating film from damage caused by ashing and dry-etching, and therefore can reduce faulty connection between a line at an upper level and a line at a lower level than the organic-inorganic film stacked body.

The organic insulating film preferably includes a photosensitive resin. This structure can effectively reduce faulty connection between lines.

The present invention also provides a method for producing the display device substrate of the present invention, and the production method includes the successive steps of: an organic insulating film etching step of etching the organic insulating film including the photosensitive resin; an inorganic insulating film formation step of forming the inorganic insulating film; and an inorganic insulating film etching step of etching the inorganic insulating film (hereinafter, also referred to as the "first method for producing a display device substrate of the present invention"). This method can ensure reduction of faulty connection between lines and enable microfabrication of lines.

The first method for producing a display device substrate of the present invention is not particularly limited and may or may not include any other steps, provided that it includes the above-mentioned steps. Hereinafter, the preferred embodiments of the first method for producing a display device substrate of the present invention are described in detail. It should be noted that any of the embodiments shown below may be applied in combination.

The inorganic insulating film etching step preferably includes dry-etching the inorganic insulating film through a first resist. This step can more reliably enable microfabrication of lines.

The inorganic insulating film etching step preferably includes removing, by etching, a portion overlapping a portion removed by etching the organic insulating film including the photosensitive resin. This step can enable formation of microfabricated contact holes.

The method for producing a display device substrate preferably includes an organic insulating film light exposure step of exposing the organic insulating film to light through a first photomask before the organic insulating film etching step. This step can more reliably ensure reduction of faulty connection between lines. Thus, the organic insulating film is preferably exposed to light and etched (developed); that is, the organic insulating film is preferably photoetched.

In the case where the above-mentioned method for producing a display device substrate includes the organic insulating film light exposure step of exposing the organic insulating film to light through the first photomask before the organic insulating film etching step, it is more preferable that the method for producing a display device substrate further includes the successive steps of: a resist film formation step of forming a second resist on the inorganic insulating film after the inorganic insulating film formation step; and a resist light exposure step of exposing the second resist to light through the first photomask. In this method, the first photoresist mask is used in both of the organic insulating film light exposure step and the resist light exposure step. Namely, this method can save one photomask used in the production processes, which may lead to reduction in production cost. If different photomasks are used, the difference in the finished designs of the photomasks may cause a mismatch in the positions of holes in the organic insulating film and the inorganic insulating film. This embodiment, however, can reduce mismatches in the positions of holes in the organic insulating film and the inorganic insulating film.

The present invention also provides a method for producing a display substrate of the present invention, and the production method includes the successive steps of: an inorganic insulating film etching step of etching the inorganic insulating film by wet-etching using a resist as a mask; a resist removal step of removing the resist; and an organic insulating film etching step of etching the organic insulating film using the inorganic insulating film as a mask (hereinafter, also referred to as the "second method for producing a display device substrate of the present invention"). Thus, the inorganic insulating film is etched by wet-etching, and therefore the resist may be removed by an etching solution not by ashing. Consequently, the wall surfaces of the organic insulating film exposed to the contact holes will be free from damage caused by ashing. In turn, it is possible to reduce faulty connection between lines.

The second method for producing a display device substrate of the present invention is not particularly limited and may or may not include any other steps, provided that it includes the above-mentioned steps.

The present invention also provides a method for producing the display device substrate of the present invention, and the production method includes the successive steps of: an inorganic insulating film etching step of etching the inorganic insulating film by dry-etching using a resist as a mask; and a step of performing dry-etching such that the resist is removed by ashing and that the organic insulating film is etched using the inorganic insulating film as a mask (hereinafter, also referred to as the "third method for producing a display device substrate of the present invention"). Since the step of removing lashing) the resist and the step of etching the organic insulating film (forming holes) are simultaneously performed, damage to the organic insulating film caused by dry-etching can be reduced. In turn, it is possible to reduce faulty connection between lines.

The third method for producing a display device substrate of the present invention is not particularly limited and may or may not include any other steps, provided that it includes the above-mentioned steps.

The present invention also provides a display device including the display device substrate of the present invention. The present invention further provides a display device including a display device substrate produced by the method for producing a display device substrate of the present invention. These allow a narrow frame design and can provide high performance and improved reliability.

The present invention also provides a method for forming a multilayer wiring structure including an organic-inorganic film stacked body in which an inorganic film is formed directly on and above an organic film including a photosensitive resin, and the formation method includes the successive steps of: an organic insulating film etching step of etching the organic insulating film; an inorganic insulating film formation step of forming the inorganic insulating film; and an inorganic insulating film etching step of etching the inorganic insulating film (hereinafter, also referred to as the "first method for forming a multilayer wiring structure of the present invention"). This method can ensure reduction of faulty connection between lines and enable microfabrication of lines.

The first method for forming a multilayer wiring structure of the present invention is not particularly limited and may or may not include any other steps, provided that it includes the above-mentioned steps. Hereinafter, the preferred embodiments of the first method for forming a multilayer wiring structure of the present invention are described in detail. It should be noted that any of the embodiments shown below may be applied in combination.

The inorganic insulating film etching step preferably includes dry-etching the inorganic insulating film through a first resist. This step can more reliably enable microfabrication of lines.

The inorganic insulating film etching step preferably includes removing, by etching, a portion overlapping a portion removed by etching the organic insulating film including the photosensitive resin. This step can enable formation of microfabricated contact holes.

The method for forming a multilayer wiring structure preferably includes an organic insulating film light exposure step of exposing the organic insulating film to light through a first photomask before the organic insulating film etching step. This step can more reliably ensure reduction of faulty connection between lines. Thus, the organic insulating film is preferably exposed to light and etched (photoetched).

In the case where the above-mentioned method for forming a multilevel wiring structure includes the organic insulating film light exposure step of exposing the organic insulating film to light through the first photomask before the organic insulating film etching step, it is more preferable that the method for forming a multilayer wiring structure includes the successive steps of: a resist formation step of forming a second resist on the inorganic insulating film after the inorganic insulating film formation step; and a resist light exposure step of exposing the second resist to light through the first photomask. In this method, the first photoresist mask is used in both of the organic insulating film light exposure step and the resist light exposure step. Namely, this method can save one photomask used in the production processes, which may lead to reduction in production cost. If different photomasks are used, the difference in the finished designs of the photomasks may cause a mismatch in the positions of holes in the organic insulating film and the inorganic insulating film. This embodiment, however, can reduce mismatches in the positions of holes in the organic insulating film and the inorganic insulating film.

The present invention also provides a method for forming a multilayer wiring structure including an organic-inorganic film stacked body in which an inorganic insulating film is formed directly on and above an organic insulating film, and the formation method includes the successive steps of: an inorganic insulating film etching step of etching the inorganic insulating film by wet-etching using a resist as a mask; a resist removal step of removing the resist; and an organic insulating film etching step of etching the organic insulating film using the inorganic insulating film as a mask (hereinafter, also referred to as the "second method for forming a multilayer wiring structure of the present invention"). Thus, the inorganic insulating film is etched by wet-etching, and therefore the resist may be removed by an etching solution not by ashing. Consequently, the wall surfaces of the organic insulating film exposed to the contact holes will be free from damage caused by ashing. In turn, it is possible to reduce faulty connection between lines.

The second method for forming a multilayer wiring structure of the present invention is not particularly limited and may or may not include any other steps, provided that it includes the above-mentioned steps.

The present invention further provides a method for forming a multilayer wiring structure including an organic-inorganic film stacked body in which an inorganic insulating film is formed directly on and above an organic insulating film, the formation method including the successive steps of: an inorganic insulating film etching step of etching the inorganic insulating film by dry-etching using a resist as a mask; and a step of performing dry-etching such that the resist is removed by ashing and that the organic insulating film is etched using the inorganic insulating film as a mask (hereinafter, also referred to as the "third method for forming a multilayer wiring structure of the present invention"). Since the step of removing (ashing) the resist and the step of etching the organic insulating film (forming holes) are simultaneously performed, damage to the organic insulating film caused by dry-etching can be reduced. In turn, it is possible to reduce faulty connection between lines.

The third method for forming a multilayer wiring structure of the present invention is not particularly limited and may or may not include any other steps, provided that it includes the above-mentioned steps.

The present inventor also found that planarizing films of inorganic insulating films also get damaged like organic insulating films due to ashing of a resist mask or dry-etching when they are used alone, and that faulty connection can be reduced by using a planarizing film and an inorganic film in combination and covering at least upper portions of the wall surfaces of holes in the planarizing film with the inorganic insulating film.

The present invention also provides a multilayer wiring board including: an insulating substrate; and a planarizing film-inorganic insulting film stacked body in which an inorganic insulating film is formed directly on and above the planarizing film on the insulating substrate. In the multilayer wiring board, at least upper portions of the wall surfaces of holes in the planarizing film are covered with the inorganic insulating film. The inorganic insulating film can be patterned by wet-etching, and in this case, the planarizing film will be free from damage caused by ashing and dry-etching. In turn, it is possible to reduce faulty connection between a line in a layer at an upper level and a line in a layer at a lower level than the planarizing film-inorganic insulting film stacked body.

The "planarizing film" used herein is a film that provides a flatter surface on projections. The surface of the planarizing film is preferably substantially flat but may have projections with a height difference of 500 nm (preferably 200 nm) or less. In the case where the planarizing film has an irregular area on the surface, the curvature radius of each projection on the irregular area is preferably larger than the height difference of the projection. This structure can effectively reduce generation of etching fragments during etching of the upper wiring layer. The planarizing film may be a film named SOG (Spin on Glass) film.

The structure of the multilayer wiring board of the present invention is not particularly limited, and the multilayer wiring board of the present invention may or may not include other components, provided that it includes the above-mentioned components. The preferred embodiments of the multilayer wiring board of the present invention are described in more detail below. It should be noted that any of the embodiments described below may be applied in combination.

The inorganic insulating film is preferably formed to cover the whole surface of the planarizing film including the wall surfaces of holes in the planarizing film although the inorganic insulating film may be formed to cover the whole surface of the planarizing film except at least lower portions of the wall surfaces of the holes in the planarizing film. Thus, it is more preferable that the wall surfaces of the holes in the planarizing film are entirely covered with the inorganic insulating film. This structure allows the use of a method including processing using a resist mask such as dry-etching which enables precise microfabrication, to etch the inorganic insulating film, and therefore can reduce faulty connection between a line in a layer at an upper level and a line in a layer at a lower level than the planarizing film-inorganic film stacked body and enables microfabrication of lines below the planarizing film-inorganic film stacked body.

The planarizing film is suitably an organic insulating film or an inorganic insulating film, and the organic insulating film preferably includes a photosensitive resin. These structures can facilitate formation of the multilayer wiring board of the present invention.

The holes in the planarizing film are preferably covered with a wiring layer at an upper level than the inorganic insulating film. In this structure, the holes in the planarizing film are covered with the wiring layer at an upper level than the inorganic insulating film, and the other region of the planarizing film is not covered with the wiring layer at an upper level of the organic insulating film but may be covered with the inorganic insulating film. This structure can protect the planarizing film from damage caused by ashing and dry-etching. In turn, it is possible to reduce faulty connection between a line in a layer at an upper level and a line in a layer at a lower level than the planarizing film-inorganic film stacked body.

The multilayer wiring board is preferably used as a display device substrate. The use of the multilayer wiring board in a display device as a display device substrate can improve the reliability of the display device.

The numbers of wiring layers in multilayer wiring structures formed by the first to third methods for forming a multilayer wiring structure of the present invention and in the multilayer wiring board of the present invention are not particularly limited, provided that they include at least two wiring layers sandwiching the planarizing film-inorganic film stacked body (wiring layers at upper and lower levels than the planarizing film-inorganic film stacked body).

EFFECTS OF THE INVENTION

The display device substrate, the method for producing the display device substrate, the display device, the method for forming a multilayer wiring structure and the multilayer wiring board of the present invention enable microfabrication of lines, and can prevent faulty connection and improve the reliability of display devices.

BEST MODES FOR CARRYING OUT THE INVENTION

The present invention is described in more detail below with reference to embodiments using figures, but is not limited only to the embodiments.

Embodiment 1

FIG. 1 are cross-sectional views schematically illustrating a frame region of a liquid crystal display device of Embodiment 1. FIG. 1(a) illustrates a terminal area, and FIG. 1(b) illustrates a peripheral circuit region. FIG. 13 is a cross-sectional view schematically illustrating a pixel region of a liquid crystal display device of Embodiment 3. In the terminal area of the liquid crystal display device 100 of the present embodiment, as shown in FIG. 1(a), a display device substrate and another circuit board, that is, a TFT substrate 11 and an FPC board 70 are connected to each other through an ACF 80.

In the liquid crystal display device 100, a CF substrate (not shown) includes an insulating substrate, a black matrix formed of a shielding material, red, green and blue color filters, an overcoat layer, a common electrode formed of a transparent conductive film, and an alignment film, and these components are arranged in this order from the bottom. The CF substrate (not shown) faces the TFT substrate, and a space between the TFT substrate 11 and the CF substrate is filled with a liquid crystal material.

In the terminal area, the TFT substrate 11 includes, as shown in FIG. 1 (a), an insulating substrate 21, a base coat film 22, a gate insulating film 24, gate electrodes 25, an inorganic insulating film 41 serving as an interlayer insulating film, a connection terminal (an external connection terminal) 26 in a first wiring layer 61, and a stacked body of an organic insulating film 51a serving as a protective film and an inorganic insulating film 41a, and these components are arranged in this order from the bottom. The organic insulating film 51a and the inorganic insulating film 41a are partially removed in an end area of the connection terminal 26, and a pad portion which contacts conductive fine particles 81 in the ACF 80) 27 is formed in the removed area. The pad 27 and a connection terminal 71 of the FPC board 70 contact the conductive fine particles 81 in the ACF 80 to connect and fix the TFT substrate 11 and the FPC board 70. The connection terminal (external connection terminal) 26 in the first wiring layer 61 is connected to the gate electrode (gate line) 25 through a contact hole 31a formed in the inorganic insulating film 41.

In the peripheral circuit region, the TFT substrate 11 includes, as shown in FIG. 1(b), the insulating substrate 21, the base coat film 22, a semiconductor layer 23, the gate insulating film 24, the gate electrode 25, the inorganic insulating film 41 serving as an interlayer insulating film, source/drain electrodes 28 and extending lines 30a in the first wiring layer 61, the stacked body of the organic insulating film 51a serving as an interlayer insulating film and a planarizing film and the inorganic insulating film 41a, extending lines 30b in a second wiring layer 62, and an organic insulating film 51 serving as a protective film, and these components are arranged in this order from the bottom. As described above, a TFT 29 that includes the semiconductor layer 23, the gate insulating film 24 and gate electrode 25 and is a part of a peripheral circuit such as a driver circuit is directly formed on the insulating substrate 21 of the TFT substrate 11. The source/drain electrodes 28 in the first wiring layer 61 is connected to a source/drain region in the semiconductor layer 23 through contact holes 31b formed through the inorganic insulating film 41 and the gate insulating film 24. The extending lines 30b in the second wiring layer 62 are connected to the source/drain electrodes 28 and the extending lines 30a in the first wiring layer 61 through contact holes (via holes) 31c formed through the organic insulating film 51a and the inorganic insulating film 41a. The peripheral circuit is not particularly limited and may be a driver circuit including a transmission gate, a latch circuit, a timing generator, an inverter circuit including a power source circuit and the like, or a circuit such as a buffer circuit, a digital-analog conversion circuit (DAC circuit), a shift register or a sampling memory.

In the pixel region (which is a display region having a plurality of pixels arranged thereon), the TFT substrate 11 includes, as shown in FIG. 13, the insulating substrate 21, the base coat film 22, the semiconductor layer 23, the gate insulating film 24, the gate electrode 25 and a storage capacitor upper electrode 66a serving as an upper electrode of a pixel storage capacitor 68a, the inorganic insulating film 41 serving as an interlayer insulating film, a source electrode 34 and a drain electrode 35 in the first wiring layer 61, the stacked body of the organic insulating film 51a serving as an interlayer insulating film and a planarizing film and the inorganic insulating film 41a serving as a gas barrier insulating film, drain line 65 in a second wiring layer 62, the organic insulating film 51 serving as a protective film, and pixel electrodes 36 provided in the respective pixels, and the alignment film (not shown) provided to cover the pixel region. These components are arranged in this order from the bottom. As described above, a TFT 29 that includes the semiconductor layer 23, the gate insulating film 24 and the gate electrode 25 and functions as a pixel switching element is directly formed in each pixel on the insulating substrate 21 of the TFT substrate 11. The pixel storage capacitor 68a that includes the semiconductor layer 23 serving as a storage capacitor lower electrode, the gate insulating film 24 and the storage capacitor upper electrode 66a is directly formed in each pixel. The source electrode 34 and the drain electrode 35 in the first wiring layer 61 are connected to the source/drain region in the semiconductor layer 23 through contact holes 31f formed through the inorganic insulating film 41 and the gate insulating film 24. The drain line 65 is connected to the drain electrode 35 in the first wiring layer 61 through a contact hole (via hole) 31g formed through the organic insulating film 51a and the inorganic insulating film 41a. The pixel electrode 36 is connected to the drain line 65 in the second wiring layer 62 through a contact hole (via hole) 31j formed in the organic insulating film 51.

The organic films including the organic insulating film 51a are highly planarized although they are soft and therefore are likely to come off or get damaged. On the other hand, the inorganic films including the inorganic insulating film 41a are hard and therefore are less likely to come off and get damaged although they are poorly planarized.

The liquid crystal display device 100 has the organic-inorganic stacked body serving as an interlayer insulating layer and/or a planarizing layer in which the inorganic insulating film 41a is formed directly on and above the organic insulating film 51a. According to this structure, in the terminal area, the inorganic insulating film 41a can protect the organic insulating film 51a because at least the upper surface of the organic insulating film 51a may be covered with the inorganic insulating film 41a. Therefore, it is possible to prevent the organic insulating film 51a from coming off or getting damaged even if rework is carried out in a process of connecting a panel and the FPC board 70, more specifically the TFT substrate 11 and the FPC board 70. In turn, it is possible to reduce exposure of the first wiring layer 61 (connection terminal 26) under the organic insulating film 51a and thereby corrosion of the wiring layer 61 caused by moisture and the like. It is also possible to reduce faulty connection of the FPC board 70 caused by fragments detached from the organic insulating film 51a. Accordingly, the reliability of the display device 100 can be improved.

Since the inorganic insulating film 41a can serve as a stopper during ashing a resist mask, this structure allows the use of a method including ashing, that is, a method including processing using a resist mask such as dry-etching that enables precise microfabrication, to form contact holes 31c, 31g in the organic insulating film 51a and the inorganic insulating film 41a. Therefore, it is possible to precisely form microfabricated lines at lower levels than the organic insulating film 51a and the inorganic insulating film 41a, and particularly lines which require microfabrication, such as the extending lines 30a in the peripheral circuit region.

The organic insulating film 51a and the organic insulating film 51, which are well-planarized, function as planarized films to provide flatter surfaces by covering irregularity caused by layers at lower levels such as the first wiring layer 61 and the TFT 29, and effectively help to reduce short circuits and can enable formation of the extending lines in the second wiring layer 62, which is located above the organic insulating film 51a.

Hereinafter, the method for producing a liquid crystal display device of Embodiment 1 is described.

To begin with, cleaning and pre-annealing, as pre-processes, are performed on the insulating substrate 21. The insulating substrate 21 is not particularly limited and preferably a substrate formed of a glass, a resin or the like for reasons of cost. Next, the following processes of (1) to (17) are performed.

(1) Base Coat Film Formation Process

A SiON film (thickness: 50 nm) and an $SiO_x$ film (thickness: 100 nm) are formed on the insulating substrate 21 in this order by Plasma Enhanced Chemical Vapor Deposition (PECVD) such that the base coat film 22 is provided. Examples of gaseous material used to form the SiON film include a mixed gas containing monosilane ($SiH_4$), nitrogen monoxide ($N_2O$), and ammonia ($NH_3$). Preferable examples of gaseous materials used to form the $SiO_x$ film include tetra ethyl ortho silicate (TEOS). The base coat film 22 may include a silicon nitride ($SiN_x$) film formed from gaseous materials such as a mixed gas containing monosilane ($SiH_4$) and ammonia ($NH_3$).

(2) Semiconductor Layer Formation Process

An amorphous silicon (a-Si) film (thickness: 50 nm) is formed by PECVD. Examples of gaseous materials used to form the a-Si film include $SiH_4$ and disilane ($Si_2H_6$). The a-Si film formed by PECVD contains hydrogen and requires a treatment for reducing the hydrogen content of the a-Si film (dehydrogenation treatment). This treatment is performed at about 500° C. Subsequently, the a-Si film is melted by laser-annealing, and then is cooled and crystallized to be transformed into a p-Si film. For example, an excimer laser is used in the laser-annealing. The p-Si film may be formed by applying a metal catalyst such as nickel (to transform the a-Si into continuous grain (CG) silicon) as a pre-process of the laser-annealing without performing the dehydration treatment and performing solid phase growth by a heating treatment. Only the solid phase growth by a heating treatment may be performed to crystallize the a-Si film. Then, dry-etching is performed with a mixed gas containing carbon tetrafluoride ($CF_4$) and oxygen ($O_2$), and the p—Si film is patterned such that the semiconductor layer 23 is provided.

(3) Gate Insulating Film Formation Process

Gaseous TEOS is used as a gaseous material to form the gate insulating film 24. The gate insulating film 24 has a thickness of 45 nm and is formed of silicon oxide. The gate insulating film 24 may be formed of any material and may be an $SiN_x$ film or an SiON film. Examples of gaseous materials used to form the $SiN_x$ film or the SiON film include the same gaseous materials listed in the base coat film formation process. The gate insulating film 24 may be a stacked body of two or more of the above-mentioned films.

(4) Ion Doping Process

In order to adjust the threshold value of the TFT 29, impurities such as boron are doped in the semiconductor layer 23 by a method such as ion doping or ion implantation. More specifically, impurities such as boron are doped in a semiconductor layer to be an N-channel TFT and a P-channel TFT (first doping step), and the impurities such as boron are further doped in a semiconductor layer to be an N-channel TFT with the semiconductor layer to be a P-channel TFT masked with a resist (second doping step). In the case where the P-channel TFT does not need threshold value control, the first doping step is not necessary.

(5) Gate Electrode and Storage Capacitor Upper Electrode Formation Process

A tantalum nitride (TaN) film (thickness: 30 nm) and a tungsten (W) film (thickness: 370 nm) are formed in this order by sputtering. Subsequently, a resist mask is formed by patterning a resist film in a desired pattern by photolithography. Then, dry-etching is performed with an etching gas containing adjusted amounts of gaseous components such as argon (Ar), sulfur hexafluoride ($SF_6$), carbon tetrafluoride ($CF_4$), oxygen ($O_2$), and chlorine ($Cl_2$) such that the gate electrodes 25 and the storage capacitor upper electrode 66a are provided. Examples of materials of the gate electrodes 25 and the capacitor upper electrode 66a include high-melting-point metals, which are stable and can be smoothly deposited, such as tantalum (Ta), molybdenum (Mo), and molybdenum-tungsten (MoW), and low-resistance metals such as aluminum (Al). The gate electrodes 25 and the storage capacitor upper electrode 66a each may be a stacked body formed of two or more kinds selected from the above materials.

(6) Source/Drain Region Formation Process

In order to form the source/drain region in the TFT 29, high-concentration impurities such as phosphorus are doped in the semiconductor layer 23 to be an N-channel TFT, and high-concentration impurities such as boron are doped in the semiconductor layer 23 to be a P-channel TFT by a method such as ion doping or ion implantation. In this step, the gate electrode 25 serves as a mask. A LDD (Lightly Doped Drain) region may be formed, if necessary. Subsequently, a heat activation treatment is performed at about 700° C. for six hours to activate impurity ions in the semiconductor layer 23. This treatment enhances electrical conductivity of the source/drain region. In order to activate the ions, excimer laser irradiation may be used.

(7) Inorganic Insulating Film Formation Process

The inorganic insulating film 41 is formed by forming an $SiN_x$ film having a thickness of 100 to 400 nm (preferably 200 to 300 nm) and a TEOS film having a thickness of 500 to 1000 nm (preferably 600 to 800 nm) by PECVD on the whole surface of the insulating substrate 21. The inorganic insulating film 41 may be, for example, an SiON film. In order to reduce deterioration of TFT characteristics caused by transient deterioration and the like, and to stabilize electrical characteristics of the TFT 29, a thin cap film (for example, TEOS film) having a thickness of about 50 nm may be formed under the inorganic insulating film 41.

(8) Contact Hole Formation Process

A resist mask is formed by patterning a resist film in a desired pattern by photolithography. Then, contact holes 31a, 31b, 31f are formed by wet-etching the gate insulating film 24 and the inorganic insulating film 41 with a fluoric acid etching solution. Alternatively, dry-etching may be performed in this etching step.

(9) Hydrogenating Process

A heat treatment is performed at about 400° C. for one hour to compensate defects of crystalline Si by hydrogen supplied from the $SiN_x$ film of the inorganic insulating film 41.

(10) First Wiring Layer Formation Process

A titanium (Ti) film (thickness: 100 nm), an aluminum (Al) film (thickness: 500 nm), and another Ti film (thickness: 100 nm) are formed in this order by a method such as sputtering. Subsequently, a resist mask is formed by patterning a resist film in a desired pattern by photolithography, and the Ti/Al/Ti metal stacked film is patterned by dry-etching such that the first wiring layer 61 is provided. In this step, the connection terminal (external connection terminal) 26, the source/drain electrodes 28, the extending lines 30a, the source electrode 34, and the drain electrode 35 are formed. The first wiring layer 61 may be formed of a metal such as Al—Si alloy instead of Al. In this embodiment, Al is used to reduce the resistance of the wiring. In the case where high heat resistance is required and a certain increase in the resistance is allowed (for example, in the case of a short wiring structure), the first wiring layer 61 may be formed of any of the above-mentioned gate electrode materials (Ta, Mo, MoW, W, TaN, and the like).

(11) Organic-Inorganic Stacked Body Formation Process

The organic insulating film 51a is formed by forming (by application) a photosensitive resin film, such as a photosensitive acrylic resin film, having a thickness of 1 to 5 μm (suitably 2 to 3 μm) on the whole surface of the insulating substrate 21 by a method such as spin coating. Examples of materials of the organic insulating film 51a include non-photosensitive resins such as non-photosensitive acrylic resins, photosensitive or non-photosensitive polyalkylsiloxane resins, photosensitive or non-photosensitive polysilazane resins, and photosensitive or non-photosensitive polyimide resins, and photosensitive or non-photosensitive parellin resins. Other examples of materials of the organic insulating film 51a include methyl-containing polysiloxanes (MSQs) and porous MSQs. The use of a photosensitive resin as a material of the organic insulating film 51a allows light exposure and etching (developing procedure) of the photosensitive resin film to form a pattern on the organic insulating film 51a before the inorganic insulating film 41a is formed. Subsequently, the inorganic film 41a is formed by forming an $SiN_x$ film having a thickness of 10 to 200 nm (preferably 20 to 100 nm) on the whole surface of the insulating substrate 21 by a method such as spluttering or PECVD, or an $SiO_2$ film having a thickness of 10 to 200 nm (preferably 20 to 100 nm) using TEOS as a gaseous material on the whole surface of the insulating substrate 21. The inorganic insulating film 41a may be, for example, an SiON film. Alternatively, the inorganic insulating film 41a may be, for example, an $SiO_2$ film or an SiN film formed by a method that enables formation of a high-quality film at low temperature, such as sputtering, CAT-CVD, ICP plasma CVD using an ICP-CVD device (produced by SELVAC Co., Ltd.) or the like, ozone oxidation using, for example, Meiden Pure Ozone Generator (produced by Meidensha Corp). Through these steps, the organic-inorganic stacked body in which the inorganic insulating film 41a is formed on the organic insulating film 51a is formed. The organic insulating film 51a and the inorganic insulating film 41a each may include a plurality of films each formed of a different material. The inorganic insulating film 41a is not necessarily formed over the whole surface of the insulating substrate 21, provided that it covers the organic insulating film 51a at least in the terminal area, the peripheral circuit region, and the pixel region.

(12) Contact Hole Formation Process

A resist mask is formed by patterning a resist film in a desired pattern by photolithography. The contact holes 31c, 31g are formed and the organic insulating film 51a and the inorganic insulating film 41a are partially removed to provide a space for a pad 27 by dry-etching with a mixed gas containing carbon tetrafluoride ($CF_4$) and oxygen ($O_2$) at controlled flow rates. Then, the resist mask is ashed (removed). In this asking step, the inorganic insulating film 41a serves as a stopper. This process can enable microfabrication of the contact holes 31c, 31g, and therefore can enable microfabrication of lines in the first wiring layer 61 located below.

In this structure, however, the exposed wall surfaces of the contact holes 31c, 31g in the organic insulating film 51a may also be ashed during the $O_2$ ashing of the resist mask. Therefore, the wall surfaces of the holes in the organic insulating film 51a may withdraw with respect to the wall surfaces of the holes in the inorganic insulating film 41a, which is on the organic insulating film 51a, such that the wall surfaces of the contact holes 31c, 31g in the inorganic insulating film 41a overhang the wall surfaces of the contact holes 31c, 31g in the organic insulating film 51a. This may result in breakage of connection between the second wiring layer 62 located above and the first wiring layer 61 located below through the contact holes 31c, 31g.

(13) Second Wiring Layer Formation Process

A titanium (Ti) film (thickness: 100 nm), an aluminum (Al) film (thickness: 500 nm), and another Ti film (thickness of 100 nm) are formed in this order by a method such as sputtering. Subsequently, a resist mask is formed by patterning a resist film in a desired pattern by photolithography. Then, the Ti/Al/Ti metal stacked film is patterned by dry-etching such that the second wiring layer 62 is provided. Through these steps, the extending lines 30b and the drain line 65 are formed. The second wiring layer 62 may be formed of a metal such as an Al—Si alloy instead of Al. In this embodiment, Al is used to reduce the resistance of the wiring. In the case where high heat resistance is required and a certain increase in the resistance is allowed (for example, in the case of a short wiring structure), the second wiring layer 62 may be formed of any of the above-mentioned gate electrode materials (Ta, Mo, MoW, W, TaN, and the like).

In this process, the holes in the organic insulating film 51a, which is a planarized film, are covered with the second wiring layer 62 on the inorganic insulating layer 41a. In this structure, the holes in the organic insulating film 51a are covered with the second wiring layer 62, and the other region of the organic insulating film 51a is not covered with the second wiring layer 62 but can be covered with the inorganic insulating film 41a. This structure can protect the organic insulating film 51a from damage caused by ashing and dry-etching, and therefore can reduce faulty connection between a line in a layer at an upper level and a line in a layer at a lower level than the organic-inorganic stacked body.

(14) Organic Insulating Film Formation Process

The organic insulating film 51 is formed by forming a photosensitive acrylic resin film having a thickness of 1 to 3 μm (preferably 2 to 3 μm) by a method such as spin coating. More specifically, the organic insulating film 51 is formed on the whole surface of the substrate 21 by applying a photosensitive acrylic resin such as a naphthoquinonediazide ultraviolet curing resin to a thickness of 1 to 5 μm (preferably 2 to 3 μm) by a method such as spin coating. Subsequently, the organic insulating film 51 is exposed to light through a photomask having a desired light-shielding pattern formed thereon, and then etched (developed) to remove a portion of the organic insulating film 51 to be the contact hole 31j. Then, the organic insulating film 51 is baked (for example, 200° C., 30 minutes). The inclination of the wall surface of the hole in the organic insulating film 51 can be reduced through this step, and therefore the aspect ratio of the contact hole 31j can be reduced. The ashing (removing) step is not required to remove a contact portion (portion to be the contact hole 31j) of the organic insulating film 51. The organic insulating film 51 may be a nonphotosensitive resin film such as a nonphotosensitive acrylic resin film, or a film formed of a resin such as a photosensitive or nonphotosensitive polyalkylsiloxane resin, a photosensitive or nonphotosensitive polysilazane resin, a photosensitive or nonphotosensitive polyimide resin, or photosensitive or nonphotosensitive parellin resin. Alternatively, the organic insulating film 51 may be formed of a methyl-containing polysiloxane (MSQ) and a porous MSQ.

(15) Pad and Pixel Portion Formation Process

An ITO film and/or an IZO film having a thickness of 50 to 200 nm (preferably 100 to 150 nm) are/is formed by a method such as sputtering, and then patterned in a desired pattern by photolithography such that the pad 27 and a pixel portion are provided. Through these steps, the pixel electrodes 36 corresponding to the respective pixels are formed on the organic insulating film 51 within the display region. Subsequently, the alignment film (not shown) is applied to the display region and is subjected to an alignment treatment. Thus, the TFT substrate 11 is completed.

(16) Panel Assembling Process

The TFT substrate 11 and the CF substrate are attached to each other, the liquid crystal material is injected, and a polarizing plate is attached by a conventionally known method such that a liquid crystal display panel is provided. The liquid crystal mode of the liquid crystal display panel is not particularly limited and examples thereof include TN (Twisted Nematic) mode, IPS (In Plane Switching) mode, VATN (Vertical Alignment Twisted Nematic) mode, and PSA mode. The liquid crystal display panel may be of a domain-division type. The liquid crystal display panel may be a transmission-type display panel, or a reflection-type display panel. Alternatively, the liquid crystal display panel may be a transflective type (reflection/transparent type) display panel. The liquid crystal display panel may be designed to be driven by a passive matrix-type system.

In the case where the liquid crystal display panel is in PSA mode, the liquid crystal display panel requires the following panel attachment process and liquid crystal injection process. Specifically, a sealing material is applied to the periphery of the pixel region of the TFT substrate 11, and a liquid crystal material containing liquid crystal molecules having a negative dielectric constant and a polymerizable component is dropwise added in the area defined by the sealing material using a dispenser or the like. The polymerizable component is not particularly limited and examples thereof include photo-polymerizable monomers and photo-polymerizable oligomers. Subsequently, the CF substrate is attached to the TFT substrate 11 having the liquid crystal material disposed thereon. These steps are carried out in vacuo. The substrates integrated body is exposed to air atmosphere so that the liquid crystal material disperses between the substrates due to the air pressure. Then, the sealing material is allowed to cure by being exposed to UV light from a UV light source that is moved along the area coated with the sealing material. Thus, the liquid crystal material is dispersed, sealed between the substrates and formed into a liquid crystal layer.

The liquid crystal material may be injected by a method including forming a liquid crystal injection opening on a side face of the substrates; injecting the liquid crystal material through the opening; and sealing the liquid crystal injection opening with a ultraviolet curing resin or the like.

Next, a light irradiation process to the polymerizable component is performed. The liquid crystal layer is irradiated with UV light from the TFT substrate 11 side with the liquid crystal molecules tilted by an alternating voltage applied between the source electrode 34 and the common electrode of the CF substrate while a voltage that turns on the TFT 29 is applied to the gate electrode. Through this process, the photo-polymerizable monomers in the liquid crystal material polymerize to yield polymers that define the pretilt angles of the liquid crystal molecules on the surfaces of the alignment films on the liquid crystal layer side.

(17) FCP Board Attaching Process

The TFT substrate 11 and the FPC board 70 are thermo-compression-bonded through the ACF (anisotropic conductive film) 80, which is a resin adhesive (e.g. a thermosetting resin such as a thermosetting epoxy resin) containing conductive fine particulates 81 dispersed therein. Through this step, the TFT substrate 11 and the FPC board 70 are connected and fixed. Even if rework is carried out after this step, it is possible to reduce coming off of the organic insulating film 51a or damage to the organic insulating film 51a because the organic insulating film 51a is protected by the inorganic insulating film 41a and is not in direct contact with the ACF 80. In turn, it is possible to reduce exposure of the first wiring layer 61 under the organic insulating film 51a and thereby to reduce corrosion of the wiring layer 61 caused by moisture and the like. It is also possible to reduce faulty connection of the FPC board 70 caused by fragments detached from the organic insulating film 51a.

Subsequently, polarizing plates are attached to the outer surfaces of the TFT substrate 11 and the CF substrate, and the liquid crystal display panel and a backlight unit are combined together. Thus, the liquid crystal display device 100 is completed.

The liquid crystal display device 100 of the present embodiment described above may have improved reliability and may enable microfabrication of lines.

The inorganic insulating film 41a between the organic insulating film 51a and the pixel electrode 36 serves as a gas barrier insulating film, and therefore can prevent defects caused by gas or bubbles in PSA mode. Namely, the inorganic insulating film 41a can protect the liquid crystal layer from invasion of gas generated from layers below the organic insulating film 51a even if gas is generated in layers below the pixel electrode 36 by irradiation of the organic insulating film 51a and the like with UV light in the light irradiation process to the polymerizable component in the case where the organic insulating film 51a and the like are formed of a photosensitive resin. Therefore, it is possible to prevent bubbles from generating in the liquid crystal layer.

In the present embodiment, the organic insulating film 51a and/or the organic insulating film 51 may be planarizing films of inorganic films (inorganic planarizing films). In this case, films formed of an Si—H containing polysiloxane (MSQ) material or porous silica films are used. The liquid crystal display device 100 of the present embodiment may have the planarizing film-inorganic film stacked body in which the inorganic insulating film is formed directly on and above the planarizing film.

Hereinafter, modified embodiments of the present embodiment are described.

FIG. 14 is a cross-sectional view schematically illustrating a peripheral circuit region of a liquid crystal display device of a modified embodiment of Embodiment 1, and FIG. 15 is a cross-sectional view schematically illustrating a pixel region of the liquid crystal display device of the modified embodiment of Embodiment 1.

In this modified embodiment, the organic insulating film 51a shown in FIGS. 14 and 15 is formed by photoetching a photosensitive resin. More specifically, the organic insulating film 51a is patterned by exposing a photosensitive resin film to light and etching the film (developing procedure) before the inorganic insulating film 41a is formed. Then, the organic insulating film 51a is baked (for example, 200° C., 30 minutes). The inclination of the wall surfaces of the holes in the organic insulating film 51a can be reduced through this step, and therefore the aspect ratios of the contact holes 31c, 31g can be reduced. The ashing (removing) step is not required to remove contact portions (portions to be the contact holes 31c, 31g) of the organic insulating film 51. Subsequently, the inorganic insulating film 41a is formed and dry-etched with carbon tetrafluoride ($CF_4$) and the like to remove portions to be the contact holes 31c, 31g of the inorganic insulating film 41a overlapping the removed portions of the organic insulating film 51a. Patterning of the inorganic insulating film 41a by dry-etching can enable microfabrication of the contact holes 31c, 31g and can also enable microfabrication of the first wiring layer 61 below the inorganic insulating film 41a. Then, the resist mask is asked and removed by O₂ plasma. In this ashing step, the inorganic insulating film 41a serves as a stopper. Through these steps, the contact holes 31c, 31g through the organic insulating film 51a and the inorganic insulating film 41a are formed.

As described above, the inorganic insulating film 41a, which is a passivation film, is formed on the organic insulating film 51a formed of a photosensitive resin. This structure can reduce damage caused in the dry process. More specifically, in the etching step of dry-etching the inorganic insulating film 41a, the inorganic insulating film 41a covers the whole surface on the liquid crystal layer side of the organic insulating film 51a. Namely, the upper surface on the liquid crystal layer side and the vertical surfaces (including the wall surfaces of the holes) of the organic insulating film 51a are covered with the inorganic insulating film 41a. This structure can reduce the organic insulating film 51a from getting damaged due to dry-etching and also can reduce the organic insulating film 51a from getting damaged due to O₂ plasma in the resist ashing step in the process for forming the contact holes 31c, 31g. From these viewpoints, it is preferable that the wall surfaces of the holes in the organic insulating film 51a are entirely covered with the inorganic insulating film 41a.

The inorganic insulating film 41a may be wet-etched in this case. In the case of wet-etching, the resist mask may be removed with a removing solution. In this case, the organic insulating film 51a can be free from damage caused by ashing and dry-etching.

FIG. 16 are cross-sectional views schematically illustrating a liquid crystal display device of another modified embodiment of Embodiment 1. FIG. 16(a) illustrates a terminal area in a frame region, and 16(b) illustrates a peripheral circuit section in the frame region. FIG. 17 is a cross-sectional view schematically illustrating a pixel region of the liquid crystal display device of the modified embodiment of Embodiment 1.

In the modified embodiment, as shown in FIGS. 16 (b) and 17, an inorganic insulating film 41c serving as a gas barrier insulating film like the inorganic insulating film 41a is formed on the organic insulating film 51. Thus, the stacked body of the organic insulating film 51 and the inorganic insulating film 41c is formed in the same manner as the stacked body of the organic insulating film 51a and the inorganic insulating film 41a.

Both of the inorganic insulating films 41a and 41c are located under the pixel electrode 36 and serve as gas barrier insulating films. Therefore, this structure can more efficiently reduce defects caused by gas or bubbles in PSA mode. Namely, even if gas is generated in layers below the pixel electrode 36 by irradiation of the organic insulating films 51a, 51 with UV light in the light irradiation process to the polymerizable component in the case where the organic insulating films 51a, 51 are each formed of a photosensitive resin, the inorganic insulating films 41a, 41c can almost completely protect the liquid crystal layer from invasion of the gas. Therefore, it is possible to more reliably reduce generation of bubbles in the liquid crystal layer.

As shown in FIG. 16(a), the terminal area does not include the organic insulating film 51. In other words, the inorganic insulating film 41c is directly formed on the inorganic insulating film 41a in the terminal area. The stacked body of the inorganic insulating films 41a, 41c provided in the terminal area can improve the mechanical strength of the films compared to an inorganic film 41a alone. With this structure, it is possible to effectively reduce various defects caused by rework after thermocompression-bonding of the FPC substrate 70.

A most-proximate lower wiring layer 69 (second wiring layer 62 in the present embodiment), which is a wiring layer directly under a top wiring layer (transparent conductive film such as an ITO film or IZO film) at the same level as that of the pixel electrode 36 is formed under a pad 27 including the top wiring layer. With this structure, it is possible to reduce terminal resistance of the pad 27. If the pad 27 is composed of only the top wiring layer, which is generally a transparent conductive film such as an ITO film, the sheet resistance is high. On the contrary, if the pad 27 is a stacked structure including the top wiring layer and low-resistance wiring layers at lower levels such as the first wiring layer 61 and the second wiring layer 62, the resistance of the pad 27 is expected to be low. However, in the case where the most-proximate lower wiring layer 69 is removed by a method such as dry-etching to obtain this structure, the surface of the wiring layer under the most-proximate lower wiring layer 69 (first wiring layer 61 in the present embodiment) is damaged by the etching. This damage causes an increase in the contact resistance between the wiring layer under the most-proximate lower wiring layer 69 (first wiring layer 61) and the top wiring layer (transparent conductive film), and therefore results in an increase in the terminal resistance. Accordingly, the most-proximate lower wiring layer 69 is preferably remained under the top wiring layer in the pad 27.

FIG. 18 are cross-sectional views schematically illustrating a liquid crystal display device of still another modified embodiment of Embodiment 1. FIG. 18(a) illustrates a terminal area in a frame region, and 18(b) illustrates a peripheral circuit section in the frame region. FIG. 19 is a cross-sectional view schematically illustrating a pixel region of the liquid crystal display device of the modified embodiment of Embodiment 1.

In this modified embodiment, as shown in FIGS. 18 (b) and 19, the inorganic insulating film 41c that serves as a gas barrier insulating film like the inorganic insulating film 41a is formed on the organic insulating film 51 instead of the inorganic insulating film 41a.

The inorganic insulating film 41c is located under the pixel electrode 36 and serves as a gas barrier film. Therefore, this structure can reduce defects caused by bubbles in PSA mode. Namely, even if gas is generated in layers below the pixel electrode 36 by irradiation of the organic insulating films 51a, 51 with UV light in the light irradiation process to the polymerizable component in the case where the organic insulating films 51a, 51 are each formed of a photosensitive resin, the inorganic insulating film 41c can almost completely protect the liquid crystal layer from invasion of gas generated from layers below the pixel electrode 36. Therefore, it is possible to more reliably reduce generation of bubbles in the liquid crystal layer. In addition, the production method of this embodiment is simpler because the method does not require the process for forming the inorganic insulating film 41a.

In the terminal area, as shown in FIG. 18(a), the inorganic insulating film 41c is formed on the organic insulating film 51a and thus the stacked body of the organic insulating film 51c and the inorganic insulating film 41c is provided. This structure can reduce various defects caused by rework after thermocompression-bonding of the FPC substrate 70 similarly to the case where the inorganic insulating film 41a is provided. The most-proximate lower wiring layer 69 is provided under the top wiring layer in the pad 27. The organic insulating film 51a shown in FIGS. 18, 19 is formed by photoetching a photosensitive resin.

FIG. 20 is a cross-sectional view schematically illustrating a pixel region of a liquid crystal display device of still another modified embodiment of Embodiment 1.

The modified embodiment shown in FIG. 20 has the same structure as that shown in FIG. 19, except that the organic insulating film 51 is formed by photoetching a photosensitive resin. Namely, the organic insulating film 51 is patterned by exposing a photosensitive resin film to light and etching the film (developing procedure) before the inorganic insulating film 41c is formed. Then, the organic insulating film 51 is baked (for example, 200° C., 30 minutes). The inclination of the wall surface of the hole in the organic insulating film 51 can be reduced through this step, and therefore the aspect ratio of the contact hole 31j can be reduced. The ashing (removing) step is not required to remove a contact portion (portion to be the contact hole 31j) of the organic insulating film 51. Subsequently, the inorganic insulating film 41c is formed and dry-etched with carbon tetrafluoride ($CF_4$) and the like to remove portions to be the contact hole 31j of the inorganic insulating film 41c overlapping the removed portions of the organic insulating film 51. Patterning of the inorganic insulating film 41c by dry-etching can enable microfabrication of the contact hole 31j and can also enable microfabrication of the second wiring layer 62 below the inorganic insulating film 41c. Then, the resist mask is ashed and removed by $O_2$ plasma. In this ashing step, the inorganic insulating film 41c serves as a stopper. Through these steps, the contact hole 31j through the organic insulating film 51 and the inorganic insulating film 41c are formed.

As described above, the inorganic insulating film 41c, which is a passivation film, is formed on the organic insulating film 51 formed of a photosensitive resin. This structure can reduce damage caused in the dry process. More specifically, in the etching step of dry-etching the inorganic insulating film 41c, the inorganic insulating film 41c covers the whole surface on the liquid crystal layer side of the organic insulating film 51. Namely, the upper surface on the liquid crystal layer side and the vertical surfaces (including the wall surfaces of the holes) of the organic insulating film 51 are covered with the inorganic insulating film 41c. This structure can reduce damage to the organic insulating film 51 caused by dry-etching and also can reduce damage to the organic insulating film 51 caused by $O_2$ plasma in the resist ashing step in the process for forming the contact hole 31j. From these viewpoints, it is preferable that the wall surfaces of the holes in the organic insulating film 51 are entirely covered with the inorganic insulating film 41c.

The inorganic insulating film 41c may be wet-etched in this case. In the case of wet-etching, the resist mask may be removed with a removing solution. In this case, the organic insulating film 51 can be free from damage caused by ashing and dry-etching.

FIG. 21 are cross-sectional views schematically illustrating a liquid crystal display device of still another modified embodiment of Embodiment 1. FIG. 21(a) illustrates a terminal area in a frame region, and FIG. 21(b) illustrates a peripheral circuit section in the frame region. FIG. 22 is a cross-sectional view schematically illustrating a pixel region of the liquid crystal display device of the modified embodiment of Embodiment 1.

In this modified embodiment, the organic insulating film 51a is etchbacked as shown in FIGS. 21, 22. More specifically, the organic insulating film 51a is formed and then etchbacked by dry-etching until the first wiring layer 61 is exposed. Subsequently, the inorganic insulating film 41a is formed, and portions to be the contact holes 31c, 31g of the inorganic insulating film 41a are removed by dry-etching with carbon tetrafluoride ($CF_4$) and the like. In this modified embodiment, the level difference between the pad 27 and the region except the pad 27 is reduced by the thickness of the organic insulating film 51a. Therefore, the difference in the extent of deformation of the conductive fine particles 81 in the ACF 80 between the pad 27 and the region except the pad 27 is suppressed to be small, and the ACF can more reliably contact the components sandwiching the ACF.

The most-proximate lower wiring layer 69 is provided under the top wiring layer of the pad 27 in the terminal area, as shown in FIG. 21(a).

FIG. 23 are cross-sectional views schematically illustrating a liquid crystal display device of still another modified embodiment of Embodiment 1. FIG. 23(a) illustrates a terminal area in a frame region, and 23(b) illustrates a peripheral circuit section in the frame region. FIG. 24 is a cross-sectional view schematically illustrating a pixel region of the liquid crystal display device of the modified embodiment of Embodiment 1.

In this modified embodiment, as shown in FIG. 24, a second storage capacitor lower electrode 67 is formed over an area overlapping the capacitor upper electrode 66a in the first wiring layer 61, and a second storage capacitor upper electrode 66b is formed over an area overlapping the capacitor upper electrode 66a in the second wiring layer 62. The area overlapping the storage capacitor lower electrode 67 and the storage capacitor upper electrode 66b of the organic insulating film 51a is removed, and the storage capacitor lower electrode 67 and the storage capacitor upper electrode 66b are arranged to face each other through the inorganic insulating film 41a. As described above, each pixel is provided with a second pixel storage capacity 68b including the storage capacitor lower electrode 67, the inorganic insulating film 41a, and the storage capacitor upper electrode 66b as well as a pixel storage capacity 68a including the semiconductor layer 23, the gate insulating film 24, and the storage capacitor upper electrode 66a. This structure can enable reduction in the sizes (areas) of the pixel storage capacity 68a and the pixel storage capacity 68b compared to the case where only one pixel storage capacity 68a is provided in each pixel, and therefore can improve the pixel aperture ratio.

The organic insulating films 51a, 51 shown in FIGS. 23, 24 are formed by photoetching a photosensitive resin, and then the inorganic insulating films 41a, 41c are formed and etched to form a pattern thereon. In the terminal area, as shown in FIG. 23(a), the stacked body of the inorganic insulating films 41a, 41c is formed on the organic insulating film 51a. The most-proximate lower wiring layer 69 is provided under the top wiring layer in the pad 27.

(Embodiment 2)

FIG. 2 are cross-sectional views schematically illustrating a frame region of a liquid crystal display device of Embodiment 2. FIG. 2(a) illustrates a terminal area, and FIG. 2(b) illustrates a peripheral circuit region. It should be noted that the overlapping contents between the present embodiment and Embodiment 1 are not described.

The liquid crystal display device 200 of the present embodiment has a structure in which a stacked body of an organic insulating film 51b and an inorganic insulating film 41b is further provided on the stacked body of the organic insulating film 51a and the inorganic insulating film 41 of the liquid crystal display device of Embodiment 1.

More specifically, in the terminal area, as shown in FIG. 2(a), a TFT substrate 12 of the present embodiment further includes an extending line 30c in the second wiring layer 62 and the stacked body of the organic insulating film 51b serving as a protective film and the inorganic insulating film 41b, and these components are formed on the stacked body of the organic insulating film 51a serving as an interlayer insulating film and a planarizing film and the inorganic insulating film 41a in this order closer to the insulating substrate 21. The extending line 30c in the second wiring layer 62 is connected to the connection terminal (external connection terminal) 26 in the first wiring layer 61 through a contact hole (via hole) 31d formed through the organic insulating film 51a and the inorganic insulating film 41a.

In the TFT substrate 12, as shown in FIG. 2 (b), the peripheral circuit region includes the stacked body of the organic insulating film 51b serving as an interlayer insulating film and a planarizing film and the inorganic insulating film 41b, and an extending line 30d in a third wiring layer 63, and these components are formed on the second wiring layer 62 in this order closer to the insulating substrate 21. The extending line 30d in the third wiring layer 63 is connected to the extending line 30b in the second wiring layer 62 through a contact hole (via hole) 31e through the organic insulating film 51b and the inorganic insulating film 41b.

Thus, the liquid crystal display device 200 of the present embodiment can enable formation of microfabricated multi-layer wiring structure including more layers.

The number of the wiring layers and the number of the stacked bodies of the organic insulating film and the inorganic insulating film are not particularly limited and appropriately selected according to the desired layout.

The liquid crystal display device 200 of the present embodiment can be produced by appropriately repeating the organic-inorganic stacked body formation process (11), the contact hole formation process (12), and the wiring layer (second wiring layer) formation process (13) of Embodiment 1 as many times as needed. The thicknesses of the organic insulating film 51b and the inorganic insulating film 41b may be 1 to 4 μm (preferably 2 to 3 μm) and 10 to 200 nm (preferably 20 to 100 nm), respectively. The organic insulating film 51b and the inorganic insulating film 41b each may include a plurality of films each formed of a different material like the organic insulating film 51a and the inorganic insulating film 41a. The material of the organic insulating film 51a and the material of the inorganic insulating film 41a may be the same as or different from those of the organic insulating film 51b and the inorganic insulating film 41b, respectively.

In the present embodiment, the organic insulating film 51a, the organic insulating film 51b, and/or the organic insulating film 51 may be planarizing films of inorganic insulating films (inorganic planarizing films). In this case, films formed of a Si—H containing polysiloxane (MSQ) material or porous silica films are used. Thus, the liquid crystal display device 200 of the present embodiment may include the planarizing film-inorganic film stacked body in which the inorganic insulating film is formed directly on and above the planarizing film.

FIG. 25 are cross-sectional views schematically illustrating a liquid crystal display device of a modified embodiment of Embodiment 2. FIG. 25(a) illustrates a terminal area in a frame region, and FIG. 25(b) illustrates a peripheral circuit section in the frame region.

In this modified embodiment, the organic insulating films 51a, 51b shown in FIG. 25 are formed by photoetching a photosensitive resin, and then the inorganic insulating films 41a, 41b are formed and etched to form a pattern thereon. In the terminal area, as shown in FIG. 25(a), the most-proximate lower wiring layer 69 is provided under the pad 27 including the top wiring layer.

(Embodiment 3)

FIG. 3 is a cross-sectional view schematically illustrating a terminal area of a liquid crystal display device of Embodiment 3. It should be noted that the overlapping contents between the present embodiment and Embodiments 1 and 2 are not described.

The liquid crystal display device 300 of the present embodiment has the same structure as that of the liquid crystal display device 200 of Embodiment 2, except that the connection terminal (external connection terminal) 26 is not in the first wiring layer 61 but in the second wiring layer 62, which is located above the first wiring layer.

More specifically, in the terminal area, as shown in FIG. 3(a), a TFT substrate 13 of the present embodiment includes extending lines 30e in the first wiring layer 61, the stacked body of the organic insulating film 51a serving as an interlayer insulating film and a planarizing film and the inorganic insulating film 41a, the connection terminal (external connection terminal) 26 in the second wiring layer 62, the stacked body of the organic insulating film 51b serving as a protective film and inorganic insulating film 41b, and these components are formed on the inorganic insulating film 41 in this order closer to the insulating substrate 21. The connection terminal (external connection terminal) 26 in the second wiring layer 62 is connected to the extending line 30e in the first wiring layer 61 through the contact hole (via hole) 31d formed through the organic insulating film 51a and the inorganic insulating film 41a.

In the case where the liquid crystal display device 200 of Embodiment 2 includes a larger number of the structure units formed by the wiring layer and the stacked body of the organic insulating film and the inorganic insulating film, the difference between the extent of deformation of the conductive fine particles 81 in the ACF 80 between the pad 27 and the region except the pad 27 is larger. This may cause nonuniform stress, possibly resulting in faulty connection between the TFT substrate 12 and the FPC board 70.

On the other hand, the recess defined by the pad 27 is small in the liquid crystal display device 300 of the present embodiment because the connection terminal 26 is formed in an layer at a level as high as possible, preferably in the wiring layer directly under the stacked body of the inorganic insulating film and the organic insulating film located at the top (second wiring layer 62 of the present embodiment). In this structure, the difference in the extent of deformation of the conductive fine particles 81 in ACF 80 between the pad 27 and the region except the pad 27 can be reduced, which may lead to reduction of faulty connection caused by nonuniform stress.

In the present embodiment, the organic insulating film 51a and/or the organic insulating film 51b may be planarizing films of inorganic insulating films (inorganic planarizing films). In this case, films formed of a Si—H containing polysiloxane (MSQ) material or porous silica films are used. Thus, the liquid crystal display device 300 of the present embodiment may include the planarizing film-inorganic film stacked body in which the inorganic insulating film is formed directly on and above the planarizing film.

FIG. 26 is a cross-sectional view schematically illustrating a terminal area in a frame region of a liquid crystal display device of a modified embodiment of Embodiment 3.

In this modified embodiment, the organic insulating films 51a, 51b shown in FIG. 26 are formed by photoetching a photosensitive resin, and then the inorganic insulating films 41a, 41b are formed and etched to form a pattern thereon.

FIG. 27 are cross-sectional views schematically illustrating a liquid crystal display device of another modified embodiment of Embodiment 3. FIG. 27(a) illustrates a terminal area in a frame region, and FIG. 27(b) illustrates a peripheral circuit section in the frame region. FIG. 28 is a cross-sectional view schematically illustrating a pixel region of the liquid crystal display device of the modified embodiment of Embodiment 3.

In the terminal area, the organic insulating film 51b is removed, as shown in FIG. 27 (a), and the inorganic insulating film 41b is directly formed on the connection terminal 26. The difference in the extent of deformation of the conductive fine particles 81 in the ACF 80 between the pad 27 and the extent in the region except the pad 27 can be further reduced because the level difference between the pad 27 and the region except the pad 27 is reduced by the thickness of the organic insulating film 51b in this modified embodiment. In addition, the ACF can more reliably contact the components sandwiching the ACF.

The most-proximate lower wiring layer 69 is provided under the top wiring layer of the pad 27. The organic insulating films 51a, 51b shown in FIGS. 27 (b) and 28 are formed by photoetching a photosensitive resin, and then the inorganic insulating films 41a, 41b are formed and etched to form a pattern thereon.

(Embodiment 4)

FIG. 4 is a cross-sectional view schematically illustrating a terminal area of a liquid crystal display device of Embodiment 4. It should be noted that the overlapping contents between the present embodiment and Embodiments 1 to 3 are not described.

The liquid crystal display device 400 of the present embodiment has the same structure as that of the liquid crystal display device 100 of Embodiment 1, except that all the organic insulating films are removed over the terminal area.

More specifically, the terminal area includes a TFT substrate 14 in which the inorganic insulating film 41a serving as a protective film is directly deposited on the connection terminal (external connection terminal) 26 in the first wiring layer 61.

It is difficult to completely eliminate the problem of low reliability caused by rework of the FPC board 70 as long as the terminal area includes the organic insulating film like the liquid crystal display devices 100, 200 and 300 of Embodiments 1 to 3. The liquid crystal display device 300 still has a level difference between the pad 27 and the region except the pad 27 by the thicknesses of the organic insulating film 51b and the inorganic insulating film 41b, and therefore the extent of deformation of the conductive particulates 81 in the ACF 80 are not completely uniform over the pad 27 and the region except the pad 27 although the liquid crystal display device 300 of Embodiment 3 can reduce faulty connection caused by nonuniform stress. Accordingly, the structure of the liquid crystal display device 300 is still to be improved to allow the ACF to more reliably contact the components sandwiching the ACF.

On the other hand, the liquid crystal display device 400 of the present embodiment has a structure in which the terminal area does not include any organic insulating film which causes problems concerning rework, and therefore is completely free from the problem of low reliability caused by rework. In this modified embodiment, the level difference between the pad 27 and the region except the pad 27 is reduced by the thickness of the organic insulating film. Therefore, the extent of deformation of the conductive fine particles 81 in the ACF BO in the pad 27 can be suppressed to be further lower, and the ACF can more reliably contact the components sandwiching the ACF.

The liquid crystal display device 400 of the present embodiment can be produced in the same manner as the liquid crystal display device 100 of Embodiment 1 except that no organic insulating film is formed in the terminal area.

In the present embodiment, it is preferable that the organic insulating film is not formed in at least a region in which anisotropy electric conduction materials such as the ACF 80 are provided.

FIG. 29 is a cross-sectional view schematically illustrating a terminal area in a frame region of a liquid crystal display device of a modified embodiment of Embodiment 4.

As shown in FIG. 29, the most-proximate lower wiring layer 69 is provided under the top wiring layer in the pad 27 in this modified embodiment.

FIG. 5 is a cross-sectional view schematically illustrating a terminal area of a liquid crystal display device of another modified embodiment of Embodiment 4.

The TFT substrate 14 may be provided with, as shown in FIG. 5, the connection terminal (external connection terminal) 26 formed in the same layer as that of the gate electrode (gate lines) 25 and extending over the terminal area, and the pad 27 including the first wiring layer 61, and a transparent conductive film such as an ITO film. In this structure, the inorganic insulating film 41 can serve as a protective film. Therefore, the liquid crystal display device can produce similar effects to those obtained in the case shown in FIG. 4 without the inorganic insulating film 41a in the terminal area.

The liquid crystal display device 400 of the present embodiment may have the same structure as that of the liquid crystal display 300 of Embodiment 3 shown in FIG. 3, except that the organic insulating film 51b is removed in the terminal area. Namely, in the terminal area, the TFT substrate 14 may include: extending lines 30e in the first wiring layer 61; the organic insulating film 51a serving as interlayer insulating films and planarizing films, and the inorganic insulating film 41a; the connection terminal (external connection terminal) 26 in the second wiring layer 62; and the inorganic insulating film 41b serving as a protective film, and these components are formed on the inorganic insulating film 41 in this order. This structure also allows the ACF to more reliably contact the components sandwiching the ACF. In this modified embodiment, the organic insulating film 51a may be a planarizing film of an inorganic insulating film (an inorganic planarizing film). In this case, a film formed of a Si—H containing polysiloxane (MSQ) material or a porous silica film is used. Thus, the liquid crystal display device 400 of the present embodiment may include the planarizing film-inorganic film stacked body in which the inorganic insulating film is formed directly on and above the planarizing film.

Hereinafter, one embodiment is described in which the organic insulating film is etched before forming the inorganic insulating film in the display devices of Embodiments 1 to 4. Although the embodiment is described based on the peripheral circuit region, the structure of the embodiment described below is not particularly limited to the peripheral circuit region and may be applied to the terminal area and the pixel region.

FIG. 6 is a cross-sectional view schematically illustrating a peripheral circuit region common to the liquid crystal display devices of Embodiments 1 to 4. FIGS. 8-1 (a) to (d) and FIGS. 8-2 (e) to (g) are cross-sectional views schematically illustrating the peripheral circuit region common to the liquid crystal display devices of Embodiments 1 to 4 in production processes. It should be noted that the overlapping contents between the present embodiment and Embodiments 1 to 4 are not described.

In the case where an organic insulating film and an inorganic insulating film are stacked and then dry-etched together in the stacked body form to form contact holes, as described in the production method in Embodiment 1, the contact holes formed through the stacked body of the organic insulating film and the inorganic insulating film generally have a high aspect ratio. This is because the organic insulating film is as thick as, for example, 2 μm or more. Such contact holes may make it difficult a line in a layer at an upper level and a line in a layer at a lower level than the stacked body to contact each other through the contact holes. Portion of the inner surfaces of the contact hole in the organic insulating film is exposed during dry-etching and resist ashing, and therefore the organic insulating film may get damaged during the etching and resist ashing.

The liquid crystal display device 500 of the present embodiment is produced by the method described below using a photosensitive resin film as material for the organic insulating film 51a and/or the organic insulating film 51.

First, the processes of Embodiment 1 are performed until the first wiring layer forming process (10). Subsequently, the organic insulating film 51a is formed by forming (by application) a photosensitive resin such as a photosensitive acrylic resin into a film on the whole surface of the insulating substrate by a method such as spin coating in the same manner as in Embodiment 1, as shown in FIG. 8-1 (a). Through this step, the first wiring layer 61 is coated with the organic insulating film 51a, and the surface of TFT substrate is planarized.

Next, the organic insulating film 51a is photoetched. Namely, as shown in FIG. 8-1 (b), the organic insulating film 51a is exposed to light through a photomask 32a having a desired light-shielding pattern formed thereon, and then etched (developed) to remove a portion of the organic insulating film 51a to be the contact hole 31c.

Subsequently, the organic insulating film 51a (photosensitive resin film) is baked (about 200° C., 30 minutes). The inclination of the wall surface of the hole in the organic insulating film 51a can be reduced through this step, and therefore the aspect ratio of the contact hole 31c can be reduced, as shown in FIG. 8-1 (c).

The inorganic insulating film 41a (e.g. an $SiN_x$ film or an $SiO_2$ film) is formed on the entire surface of the insulating substrate, as shown in FIG. 8-1 (d), in the same manner as in Embodiment 1 by a method such as sputtering or PECVD. Considering effects such as contamination of a chamber, sputtering is preferably used to form the inorganic insulating film 41a because this technique enables formation of a film with the substrate kept at a low temperature. The quality of the inorganic insulating film 41a formed as described above can be improved. On the contrary, high temperature treatment may cause flying fragments from the organic components, and therefore may cause deterioration of the film performance and contamination of the chamber.

Subsequently, the resist is subjected to photolithography to form a pattern thereon. More specifically, as shown in FIG. 8-2 (e), the resist 33a is exposed to light through a photomask 32b, which is different from the photomask 32a, and then is subjected to the developing processing to remove a portion to be the contact hole 31c of the resist 33a.

As shown in FIG. 8-2(f), the contact hole 31c is formed by etching the inorganic insulating film 41a by dry-etching with carbon tetrafluoride ($CF_4$) or the like or wet-etching with fluoric acid (HF) or the like using the resist 33a as a mask so that the wall surface of the hole formed in the organic insulating film 51a is completely covered with the inorganic insulating film 41a and that the hole formed in the inorganic insulating film 41a corresponds to the removed portion of the organic insulating film 51a.

As shown in FIG. 8-2(g), in the case of dry-etching in which the inorganic insulating film 41a serves as a stopper, the resist 33a is ashed by $O_2$ plasma whereas in the case of wet-etching in which the inorganic insulating film 41a serves as a stopper, a resist removal solution is used to remove the resist 33a.

Subsequently, the liquid crystal display device 500 of the present embodiment shown in FIG. 6 is completed through the processes after the second wiring layer formation process (13) in the same manner as in Embodiment 1.

The ashing (removing) step is not required when contact portion (portion to be the contact holes 31c) of the organic insulating film 51a is removed because a photosensitive resin is used to form the organic insulating film 51a. As shown in FIG. 6, the contact portion (hole) of the organic insulating film 51a formed by the photoetching has a gently sloping wall compared to a contact portion formed by a dry process. Consequently, the contact hole 31c can be formed to have a small aspect ratio, and therefore can effectively reduce disconnection of the second wiring layer 62 stacked thereon.

The whole surface of the organic insulating film 51a including the inner wall (wall surface) of the contact portion is covered with the inorganic insulating film 41a in the following inorganic insulating film formation process. Therefore, the organic insulating film 51a can be protected from damage caused in the following step of etching the inorganic insulating film 41a.

Dry-etching that enables more precise microfabrication than photoetching can be used to etch the inorganic insulating film 41a that is formed after the photoetching of the organic insulating film 51a. Therefore, this method also enables microfabrication of the contact hole 31c and microfabrication of the first wiring layer 61 located below.

If the present embodiment is applied to Embodiment 4, this combination can facilitate removal of the organic insulating film in the terminal area which does not require precise microfabrication before formation of the inorganic insulating film 41a because the organic insulating film 51a is formed of a photosensitive rein.

FIG. 12 is a cross-sectional view schematically illustrating another embodiment of the peripheral circuit region shown in FIG. 8-2 (g). If wet-etching is applied to etch the inorganic insulating film 41a, a larger hole may be formed in the inorganic insulating film 41a than a hole in the organic insulating film 51a. In this case a lower portion of the wall surface of the hole in the organic insulating film 51a may be exposed as shown in FIG. 12. This structure can also protect the organic insulating film 51a from damage caused by ashing and dry-etching.

In this case, the contact hole may be formed by forming, photoetching and baking the organic insulating film 51a and forming the inorganic insulating film 41a by the above-mentioned method (FIGS. 8-1(a) to (d)); forming a pattern on the resist with a photomask, which is different from the photomask 32a; etching the inorganic insulating film 41a by wet-etching with fluoric acid (HF) or the like using the resist as a mask so that a lower portion of the wall surface of the hole in the organic insulating film 51a is exposed; and then removing the resist with a resist removing solution.

Hereinafter, modified embodiments of the present embodiment are described. FIGS. 9-1(a) to (d) and FIGS. 9-2 (e) to (h) are cross-sectional views schematically illustrating a peripheral circuit region common to liquid crystal display devices of modified embodiments of Embodiments 1 to 4 in production processes.

First, the processes of Embodiment 1 are performed until the first wiring layer forming process (10) in this modified embodiment. Subsequently, the organic insulating film 51a is formed by forming (by application) a photosensitive resin such as a photosensitive acrylic resin into a film on the whole surface of the insulating substrate by a method such as spin coating in the same manner as in Embodiment 1, as shown in FIG. 9-1(a). Through this step, the first wiring layer 61 is coated with the organic insulating film 51a, and the surface of TFT substrate is planarized.

Next, the organic insulating film 51a is photoetched. Namely, as shown in FIG. 9-1(b), the organic insulating film 51a is exposed to light through the photomask 32c having a desired light-shielding pattern formed thereon, and then is subjected to the developing processing to remove a portion to be the contact hole 31c of the organic insulating film 51a. The organic insulating film 51a is over-exposed so that the hole (contact portion) in the organic insulating film 51a is larger than the hole (contact portion) in the inorganic insulating film 41a.

Subsequently, the organic insulating film 51a (photosensitive resin film) is baked (about 200° C., 30 minutes). The inclination of the wall surface of the hole in the organic insulating film 51a can be reduced through this step, and therefore the aspect ratio of the contact hole 31c can be reduced, as shown in FIG. 9-1(c).

The inorganic insulating film 41a (e.g. an $SiN_x$ film or an $SiO_2$ film) is formed on the whole surface of the insulating substrate, as shown in FIG. 9-1(d), in the same manner as in Embodiment 1 by a method such as sputtering or PECVD. Considering effects such as contamination of the chamber, sputtering is preferably used to form the inorganic insulating film 41a because this technique enables formation of a film with the substrate kept at a low temperature. The quality of the inorganic insulating film 41a formed as described above can be improved. On the contrary, high temperature treatment may cause flying fragments from the organic components, and therefore may cause deterioration of the film performance and contamination of the chamber.

Subsequently, the resist is subjected to photolithography to form a pattern thereon. More specifically, as shown in FIG. 9-2 (e), the resist 33b is exposed to light through the photomask 32c, which has been used for the light exposure of the organic insulating film 51a, and then is subjected to the developing processing to remove a portion to be the contact hole 31c of the resist 33b. The resist 33b is exposed to light with normal intensity so that the hole in the inorganic insulating film 41a is smaller than the hole in the organic insulating film 51a.

As shown in FIG. 9-2 (f), the contact hole 31c is formed by etching the inorganic insulating film 41a by dry-etching with carbon tetrafluoride (CF4) or the like or wet-etching with fluoric acid (HF) or the like using the resist 33b as a mask so that the removed portion of the inorganic insulating film 41a overlaps the removed portion of the organic insulating film 51a. The organic insulating film 51a can be protected from damage caused by the etching step and the following asking step because the organic insulating film 51a is covered with the inorganic insulating film 41a as shown in FIG. 9-2(g), which is an enlarged view of the area surrounded by the dot line in FIG. 9-2(f). Techniques such as dry-etching which enable more precise microfabrication than photoetching can be used to etch the inorganic insulating film 41a. Therefore, this method also enables microfabrication of the contact hole 31c and microfabrication of the first wiring layer 61 located below.

As shown in FIG. 9-2(h), in the case of dry-etching in which the inorganic insulating film 41a serves as a stopper, the resist 33b is ashed by $O_2$ plasma; whereas in the case of wet-etching in which the inorganic insulating film 41a serves as a stopper, a resist removal solution is used to remove the resist 33b.

In this modified embodiment, the photoresist mask 32c is used in both of the organic insulating film 51a light exposure step and the resist 33b light exposure step. Namely, this modified embodiment can save one photomask used in the production processes, which may lead to reduction in production cost. In addition, this modified embodiment can reduce mismatches in the position of holes in the organic insulating film 51a and the inorganic insulating film 41a caused by a mismatch in the finished designs of different photomasks.

FIGS. 10-1(a) to (c) and FIGS. 10-2 (d) to (f) are cross-sectional views schematically illustrating a peripheral circuit region common to liquid crystal display devices of other modified embodiments of Embodiments 1 to 4 in production processes.

First, the processes of Embodiment 1 are performed until the first wiring layer forming process (10) in this modified embodiment. Subsequently, the organic insulating film 51a is formed by forming (by application) a photosensitive resin such as a photosensitive acrylic resin into a film on the whole surface of the insulating substrate by a method such as spin coating in the same manner as in Embodiment 1, as shown in FIG. 10-1(a). Through this step, the first wiring layer 61 is coated with the organic insulating film 51a, and the surface of TFT substrate is planarized.

Subsequently, the organic insulating film 51a may be optionally exposed to light and then is baked (about 200° C., 30 minutes). In this modified embodiment, the organic insulating film 51a may be formed of a photosensitive resin or a non-photosensitive resin.

The inorganic insulating film 41a (e.g. an $SiN_x$ film or an $SiO_2$ film) is formed on the whole surface of the insulating substrate, as shown in FIG. 10-1(b), in the same manner as in Embodiment 1 by a method such as sputtering or PECVD. Considering effects such as contamination of the chamber, sputtering is preferably used to form the inorganic insulating film 41a because this technique enables formation of a film with the substrate kept at a low temperature. The quality of the inorganic insulating film 41a formed as described above can be improved. On the contrary, high temperature treatment may cause flying fragments from the organic components, and therefore may cause deterioration of the film performance and contamination of the chamber.

Subsequently, the resist is subjected to photolithography to form a pattern thereon. More specifically, as shown in FIG. 10-1 (c), the resist 33c is exposed to light through a photomask 32d and then is subjected to the developing processing to remove a portion to be the contact hole 31c of the resist 33a.

Next, as shown in FIG. 10-2 (d), a portion to be the contact hole 31c of the inorganic insulating film 41a is removed by wet-etching with fluoric acid (HF) or the like using the resist 33c as a mask.

As shown in FIG. 10-2(e), the resist 33c is removed with a resist removing solution. In this step, the inorganic insulating film 41a serves as a stopper.

As shown in FIG. 10-2 (f), the contact hole 31c is formed by etching the organic insulating film 51a by dry-etching with $O_2$ plasma or the like using the inorganic insulating film 41a as a mask.

Thus, in the present modified embodiment, any step including ashing to remove the resist is not required and a resist can be removed with a resist removal solution because the inorganic insulating film 41a is etched by wet-etching. Therefore, the wall surface of the hole in the organic insulating film 51*a*, which is exposed to the contact hole 31*c*, is free from damage caused by ashing.

FIGS. 11(*a*) and 11(*b*) are cross-sectional views schematically illustrating a peripheral circuit region common to liquid crystal display devices of other modified embodiments of Embodiments 1 to 4 in production processes.

First, as shown in FIG. 10-1(*c*), the processes are performed in the same manner as in the above-described modified Example until the pattern formation process on the resist 33*c* in this modified embodiment.

As shown in FIG. 11(*a*), a portion to be the contact hole 31*c* of the inorganic insulating film 41*a* is removed by dry-etching with carbon tetrafluoride (CF4) or the like using the resist 33*c* as a mask. The application of dry-etching enables microfabrication of the contact hole 31*c*.

As shown in FIG. 11(*b*), the contact hole 31*c* is formed by ashing the resist 33*b* and etching the organic insulating film 51*a* by dry-etching with $O_2$ plasma or the like using the inorganic insulating film 41*a* as a stopper.

Since the step of removing (ashing) the resist 33*b* and the step of etching (forming an opening) the organic insulating film 51*a* are simultaneously performed in this modified embodiment, damage to the organic insulating film 51*a* caused by dry-etching can be reduced.

In the present embodiment, the organic insulating film 51*a* and/or the organic insulating film 51 may be planarizing films of inorganic insulating films (inorganic planarizing films). In this case, films formed of a Si—H containing polysiloxane (MSQ) material or porous silica films are used. Thus, the liquid crystal display device 500 of the present embodiment may include the planarizing film-inorganic film stacked body in which the inorganic insulating film is formed directly on and above the planarizing film.

The foregoing description of the invention illustrates and describes the present invention based on Embodiments 1 to 4 and the modified embodiments thereof. It is to be understood that the present invention is capable of use in various other combinations of the embodiments within the scope of the inventive concept as expressed herein. For example, the display device substrate of the present invention may not include the peripheral circuit region and may only include the terminal area having the organic-inorganic film stacked body. Alternatively, the display device substrate of the present invention may have the organic-inorganic film stacked body only in the peripheral circuit region but not in the terminal area.

Although the present invention is described with the examples of the liquid crystal display devices, the present invention is applicable to display devices such as organic electroluminescent displays in addition to liquid crystal display devices.

The method for forming a multilayer wiring structure and the multilayer wiring board of the present invention are applicable to, for example, semiconductor substrates used in semiconductor integrated circuits and wiring boards such as FPC boards.

The present application claims priority under the Paris Convention and the domestic law in the country to be entered into national phase on Patent Application No. 2008-53779 filed in Japan on Mar. 4, 2008, the entire contents of which are hereby incorporated by reference.

BRIEF DESCRIPTION OF DRAWINGS

FIG. 1(*a*) illustrates a terminal area, and FIG. 1(*b*) illustrates a peripheral circuit region.

FIG. 2(*a*) illustrates a terminal area, and FIG. 2(*b*) illustrates a peripheral circuit region.

FIG. 7(*a*) illustrates a terminal area, and FIG. 7(*b*) illustrates a peripheral circuit region.

FIGS. 8-1(*a*) to (*d*) are cross-sectional views schematically illustrating a peripheral circuit region common to the liquid crystal display devices of Embodiments 1 to 4 in production processes; and FIGS. 8-2 (*e*) to (*g*) are cross-sectional views schematically illustrating the peripheral circuit region common to the liquid crystal display devices of Embodiments 1 to 4 in production processes.

FIGS. 9-1 (*a*) to (*d*) are cross-sectional views schematically illustrating a peripheral circuit region common to liquid crystal display devices of modified embodiments of Embodiments 1 to 4 in production processes; and FIGS. 9-2(*e*) to (*h*) are cross-sectional views schematically illustrating the peripheral circuit region common to the liquid crystal display devices of the modified embodiments of Embodiments 1 to 4 in production processes.

FIGS. 10-1(*a*) to (*c*) are cross-sectional views schematically illustrating a peripheral circuit region common to liquid crystal display devices of other modified embodiments of Embodiments 1 to 4 in production processes; FIGS. 10-2(*d*) to (*f*) are cross-sectional views schematically illustrating the peripheral circuit region common to the liquid crystal display devices of the modified embodiments of Embodiments 1 to 4 in production processes.

FIG. 16(*a*) illustrates a terminal area in a frame region, and 16(*b*) illustrates a peripheral circuit section in the frame region.

FIG. 18(a) illustrates a terminal area in a frame region, and FIG. 18(b) illustrates a peripheral circuit section in the frame region.

FIG. 21(a) illustrates a terminal area in a frame region, and FIG. 21(b) illustrates a peripheral circuit section in the frame region.

FIG. 23(a) illustrates a terminal area in a frame region, and FIG. 23(b) illustrates a peripheral circuit section in the frame region.

FIG. 25(a) illustrates a terminal area in a frame region, and FIG. 25(b) illustrates a peripheral circuit section in the frame region.

FIG. 27(a) illustrates a terminal area in a frame region, and FIG. 27(b) illustrates a peripheral circuit section in the frame region.

Figure 1:
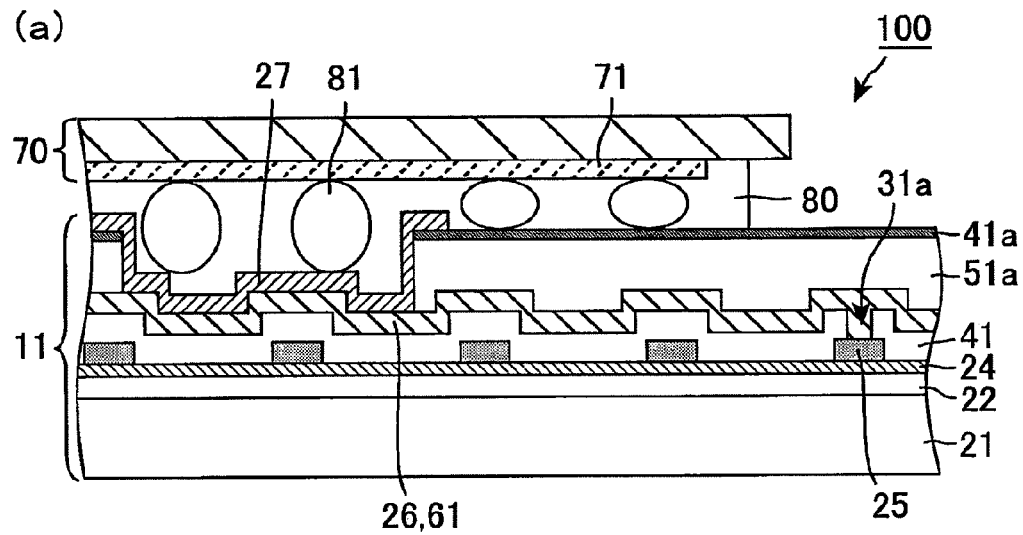
FIG. 1 are cross-sectional views schematically illustrating a frame region of a liquid crystal display device of Embodiment 1.
Figure 1:
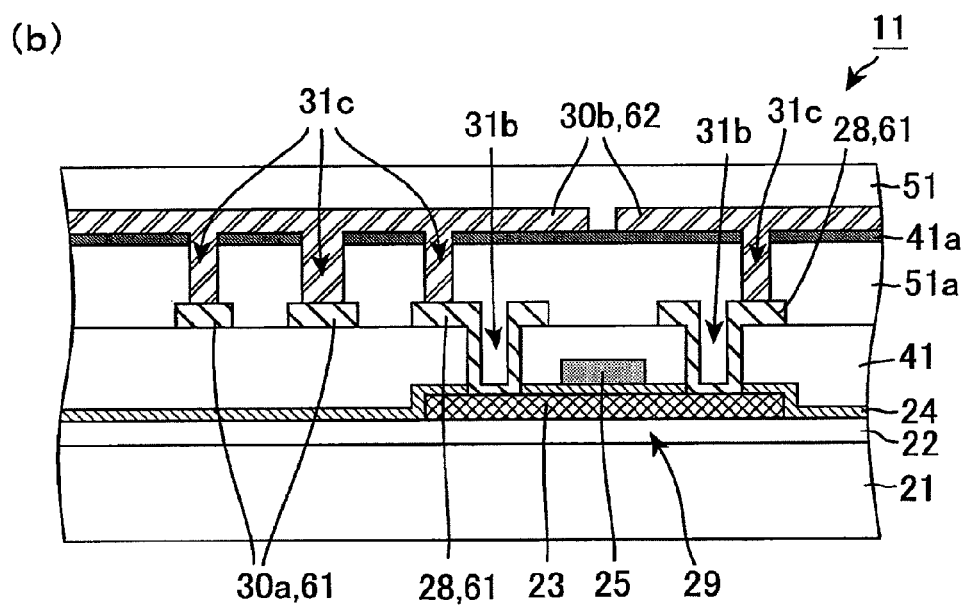
Figure 2:
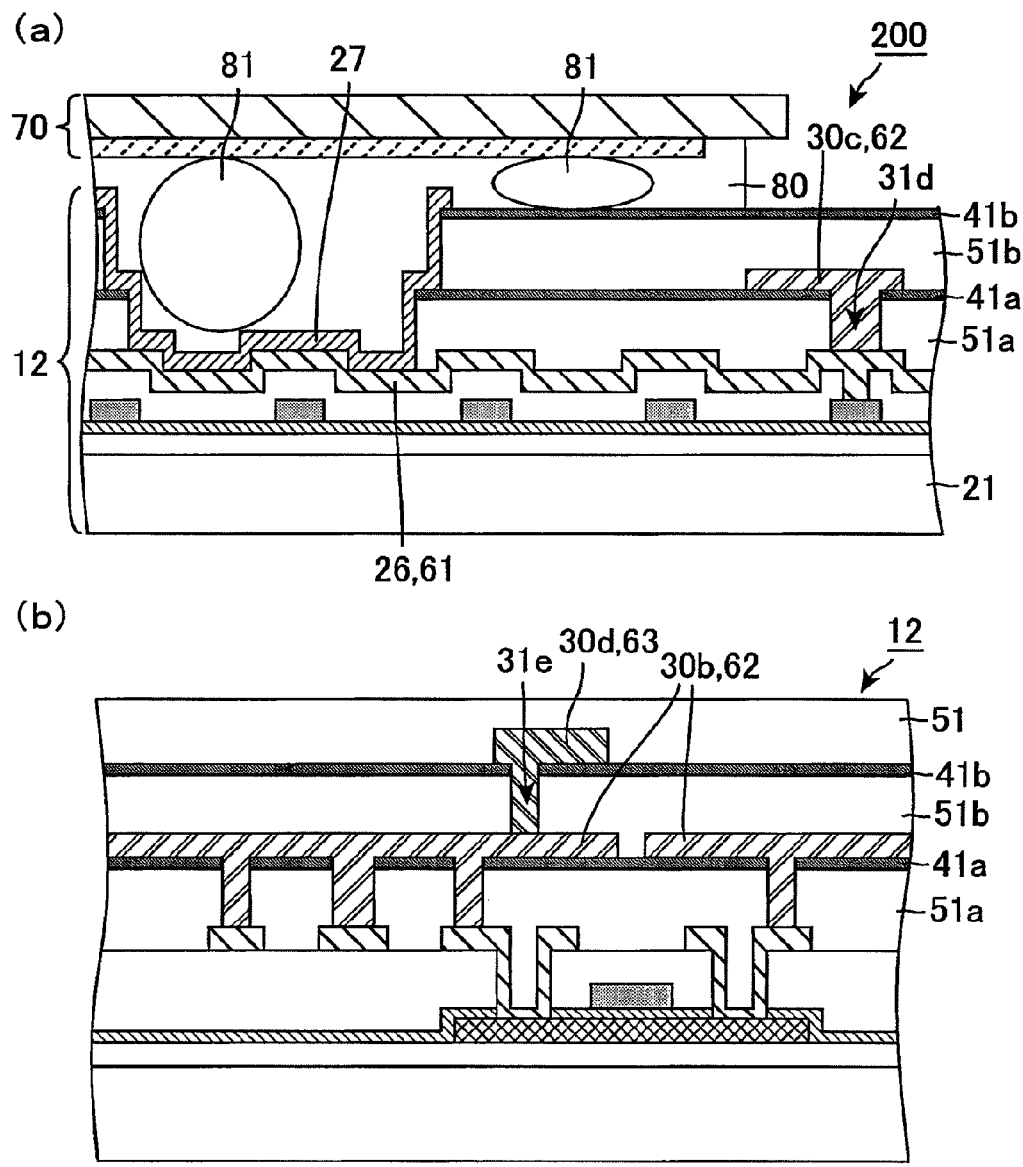
FIG. 2 are cross-sectional views schematically illustrating a frame region of a liquid crystal display device of Embodiment 2.
Figure 3:
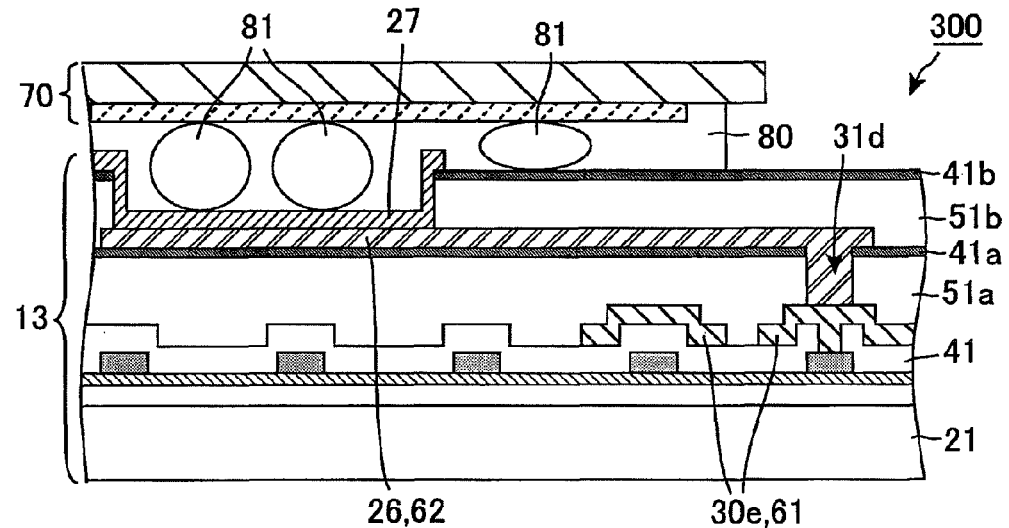
FIG. 3 is a cross-sectional view schematically illustrating a terminal area of a liquid crystal display device of Embodiment 3.
Figure 4:
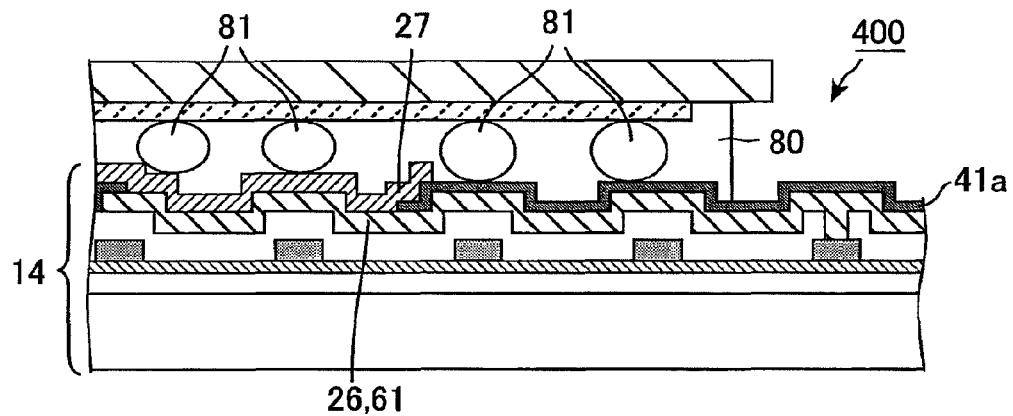
FIG. 4 is a cross-sectional view schematically illustrating a terminal area of a liquid crystal display device of Embodiment 4.
Figure 5:
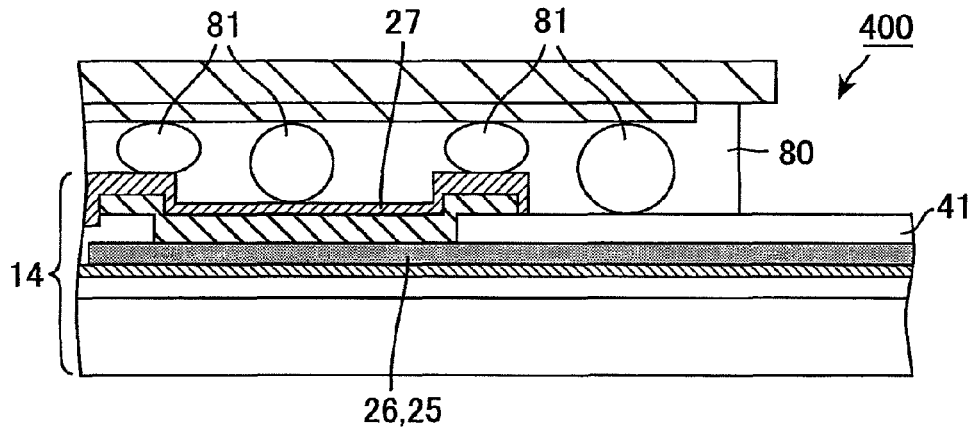
FIG. 5 is a cross-sectional view schematically illustrating a terminal area of a liquid crystal display device of a modified embodiment of Embodiment 4.
Figure 6:
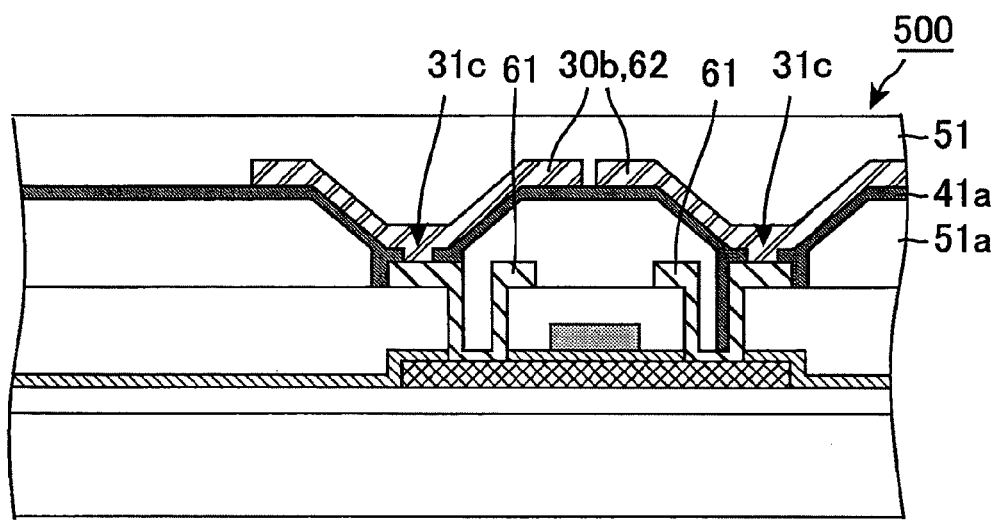
FIG. 6 is a cross-sectional view schematically illustrating a peripheral circuit region common to the liquid crystal display devices of Embodiments 1 to 4.
Figure 7:
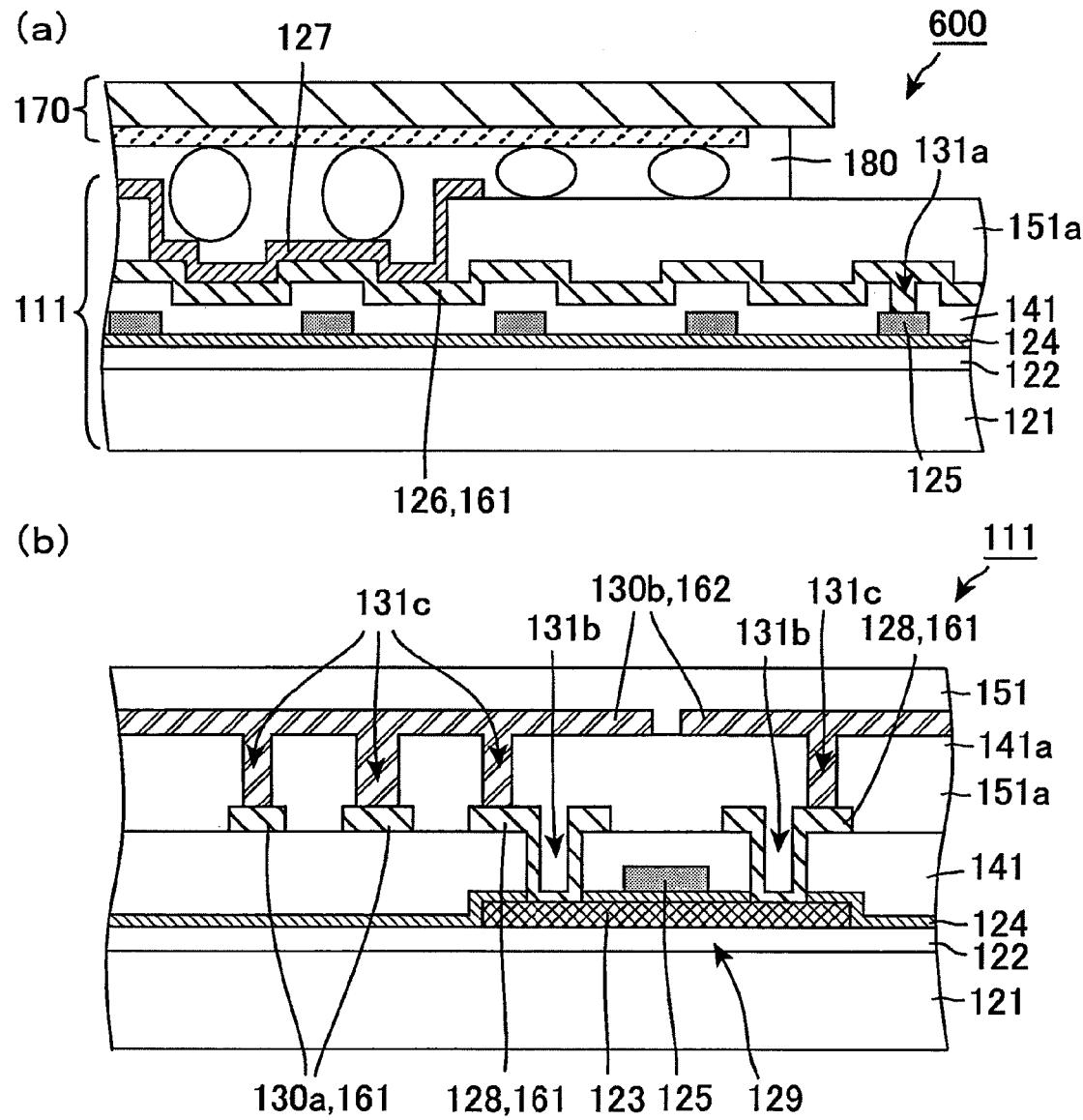
FIG. 7 are cross-sectional views schematically illustrating a frame region of a conventional liquid crystal display device.
Figure 11:
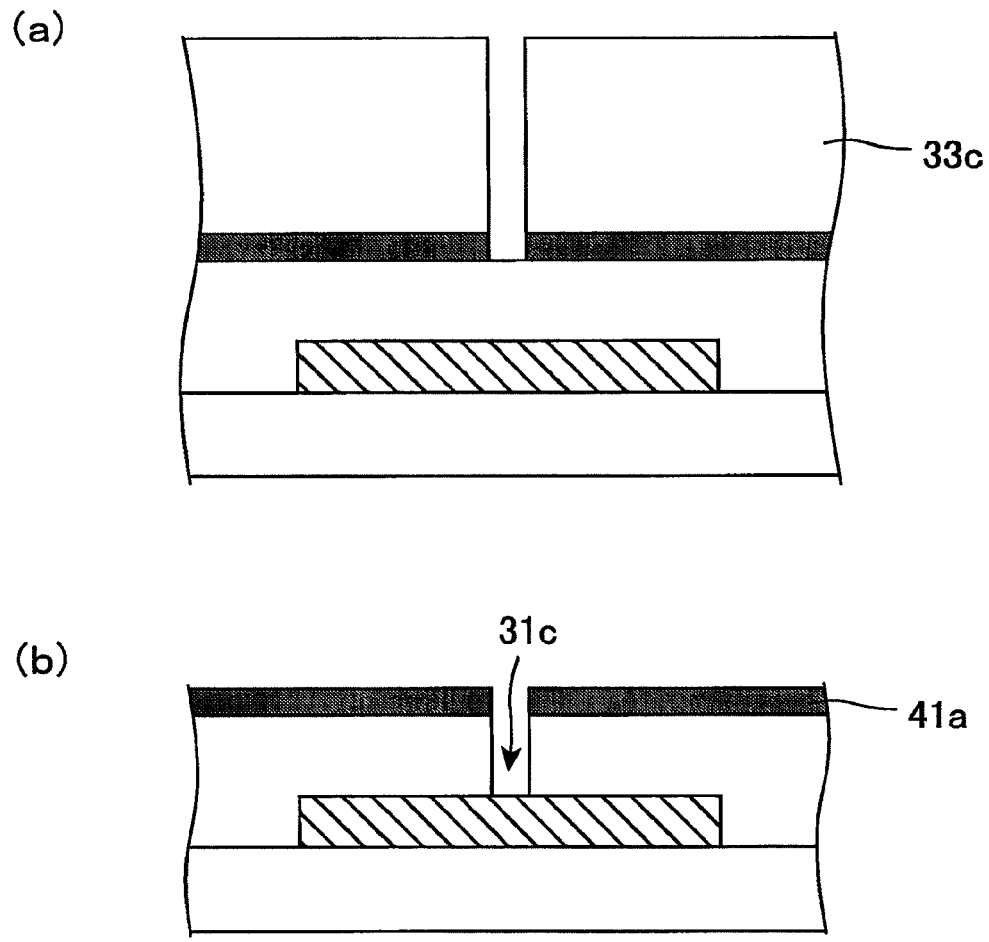
FIGS. 11(*a*) and 11(*b*) are cross-sectional views schematically illustrating a peripheral circuit region common to liquid crystal display devices of other modified embodiments of Embodiments 1 to 4 in production processes.
Figure 12:
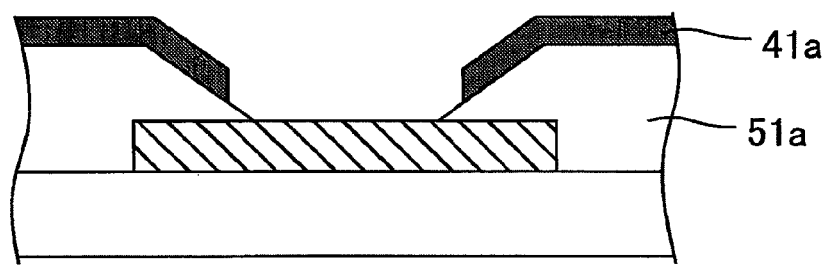
FIG. 12 is a cross-sectional view schematically illustrating another embodiment of the peripheral circuit region shown in FIG. 8-2(*g*).
Figure 13:
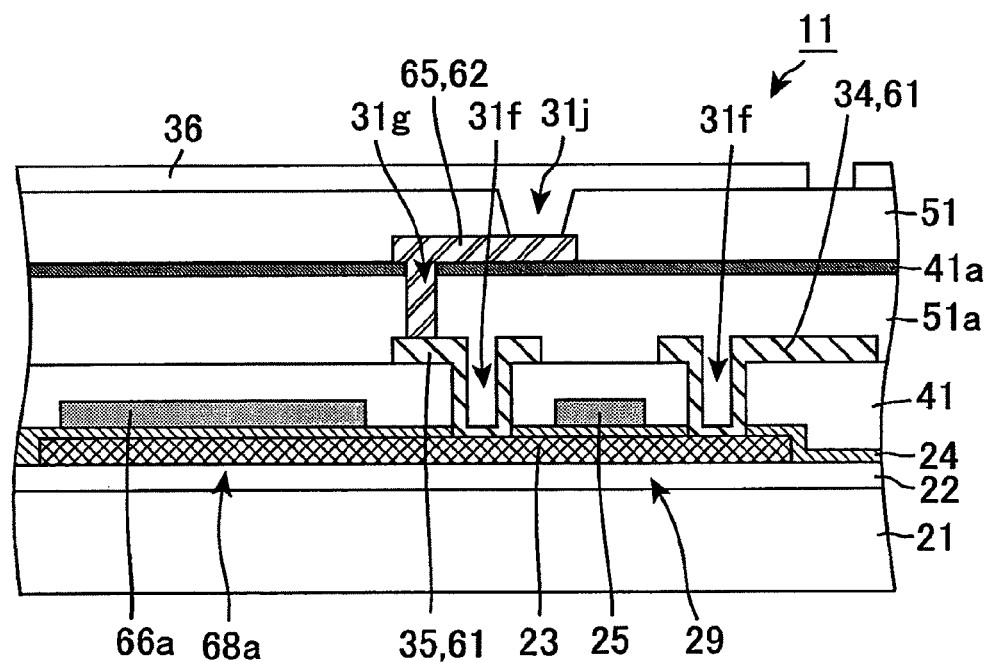
FIG. 13 is a cross-sectional view schematically illustrating a pixel region of the liquid crystal display device of Embodiment 1.
Figure 14:
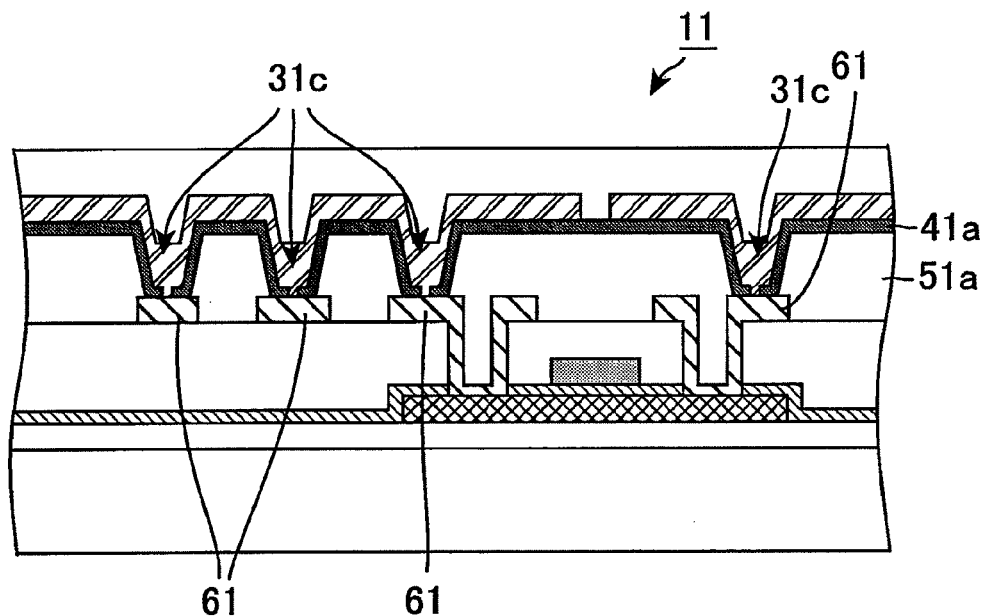
FIG. 14 is a cross-sectional view schematically illustrating a peripheral circuit region of a liquid crystal display device of a modified embodiment of Embodiment 1.
Figure 15:
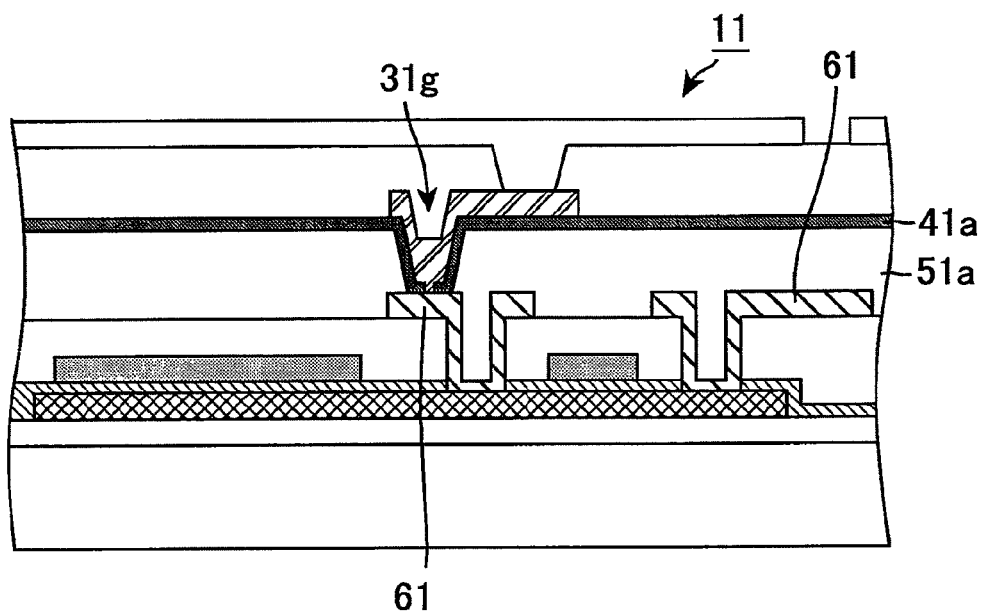
FIG. 15 is a cross-sectional view schematically illustrating a pixel region of the liquid crystal display device of the modified embodiment of Embodiment 1.
Figure 16:
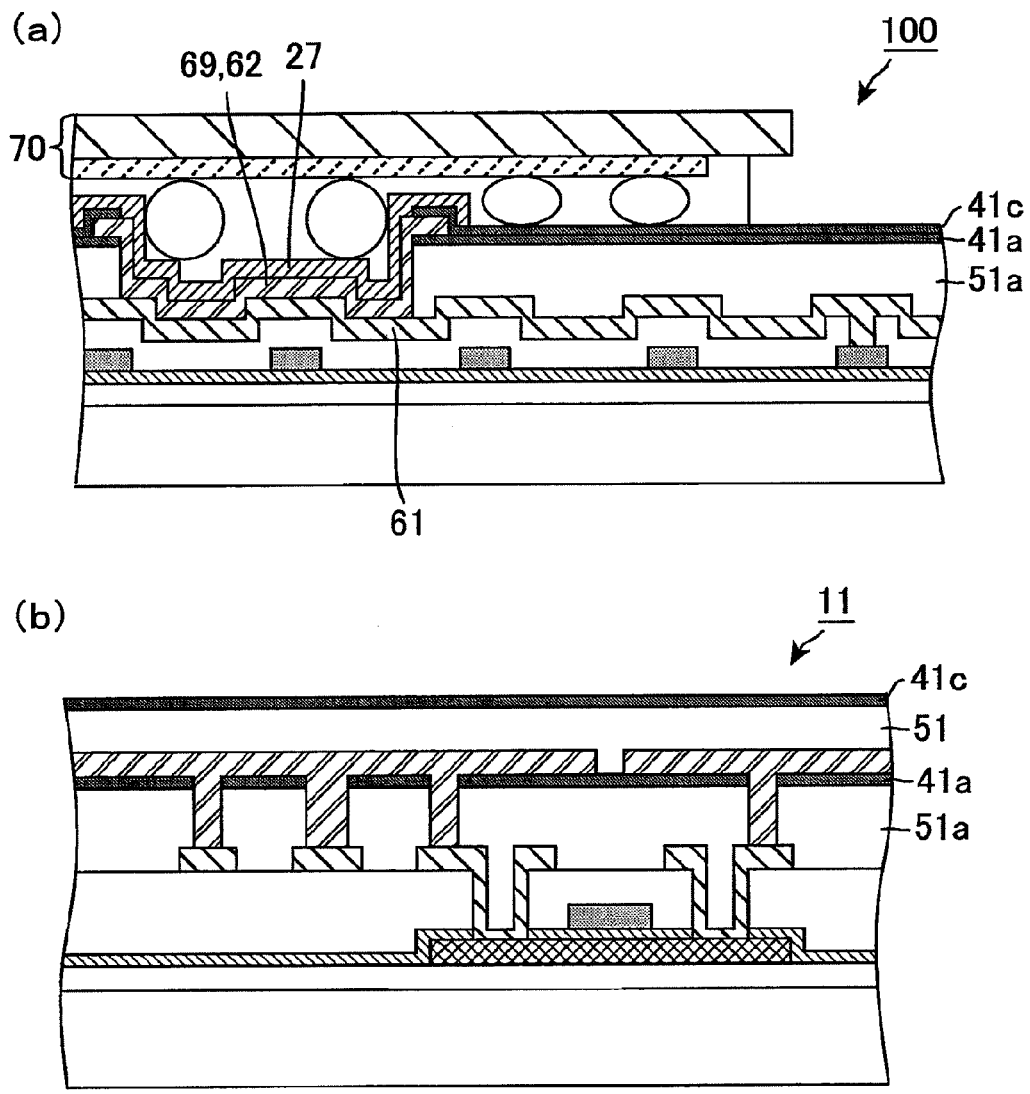
FIG. 16 are cross-sectional views schematically illustrating a liquid crystal display device of another modified embodiment of Embodiment 1.
Figure 17:
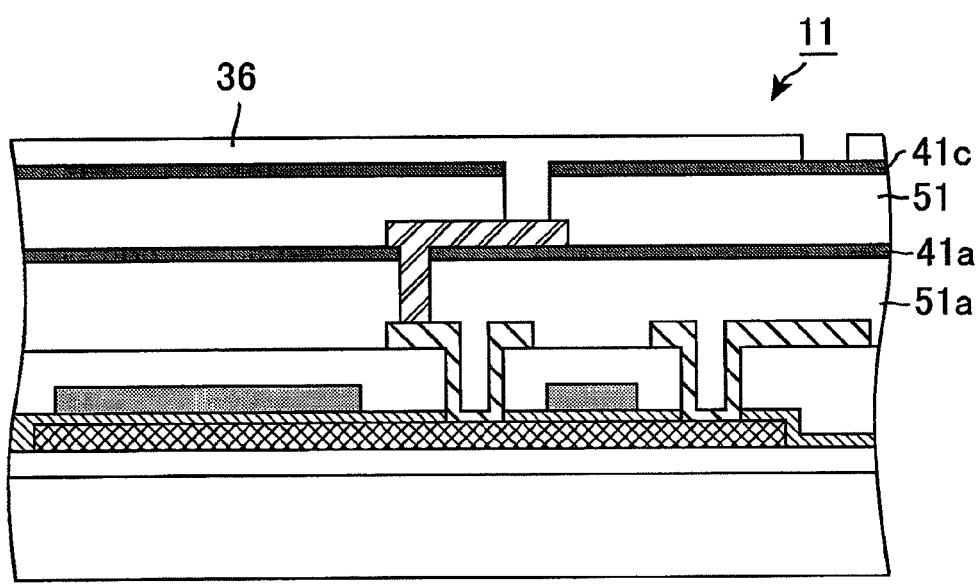
FIG. 17 is a cross-sectional view schematically illustrating a pixel region of the liquid crystal display device of the modified embodiment of Embodiment 1.
Figure 18:
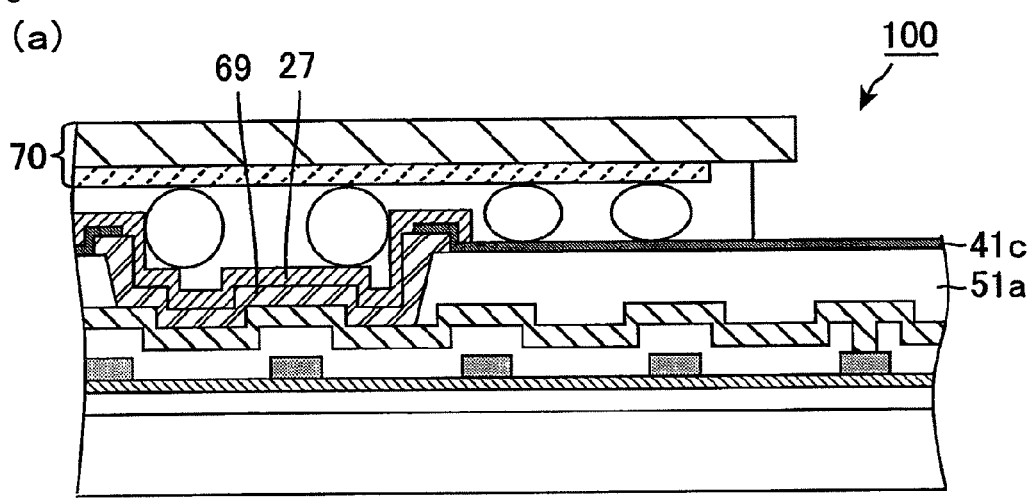
FIG. 18 are cross-sectional views schematically illustrating a liquid crystal display device of still another modified embodiment of Embodiment 1.
Figure 18:
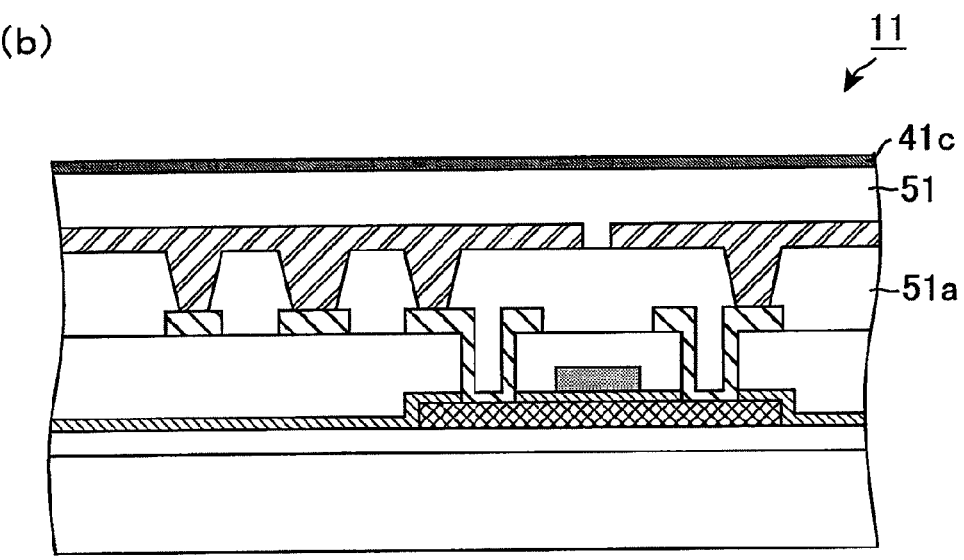
Figure 19:
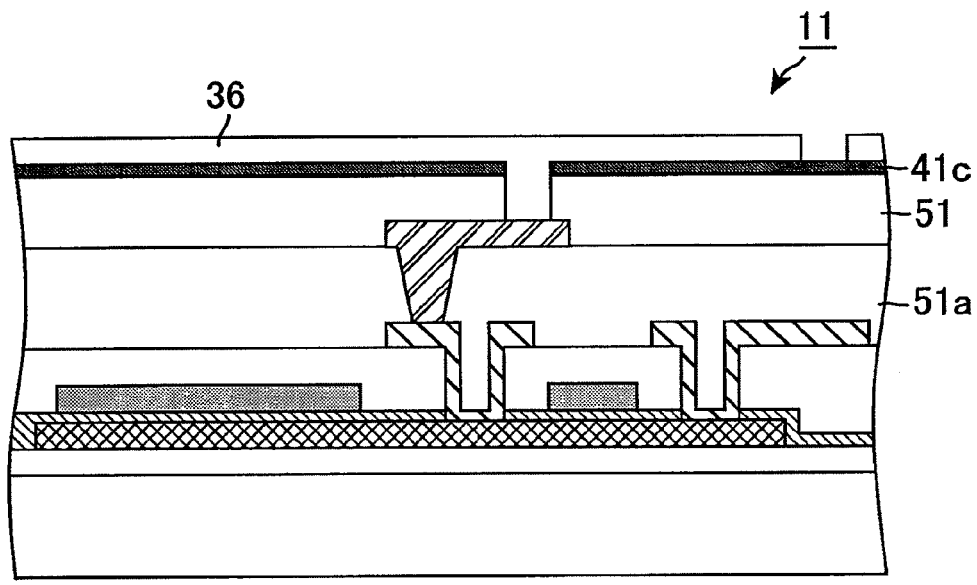
FIG. 19 is a cross-sectional view schematically illustrating a pixel region of the liquid crystal display device of the modified embodiment of Embodiment 1.
Figure 20:
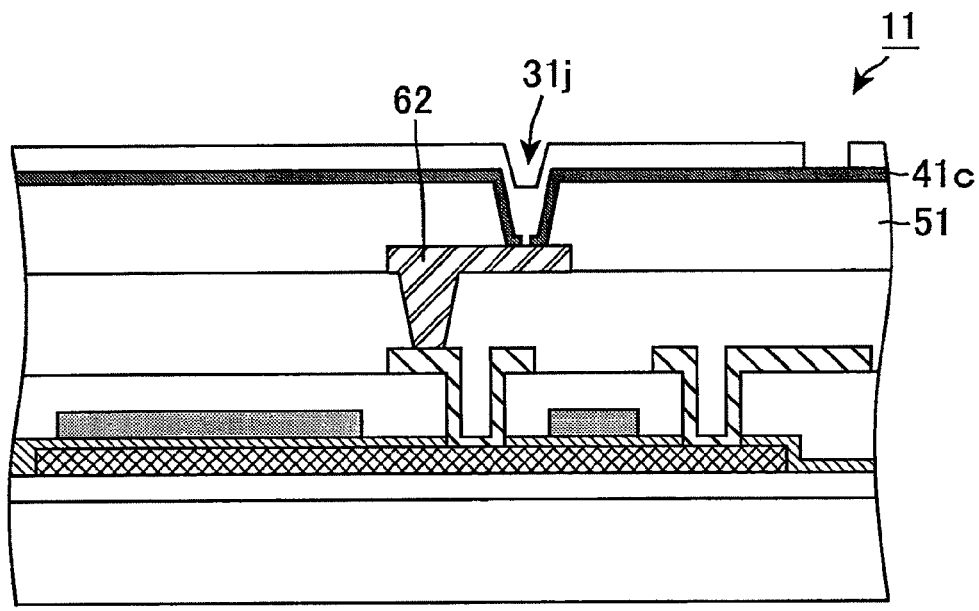
FIG. 20 is a cross-sectional view schematically illustrating a pixel region of a liquid crystal display device of still another modified embodiment of Embodiment 1.
Figure 21:
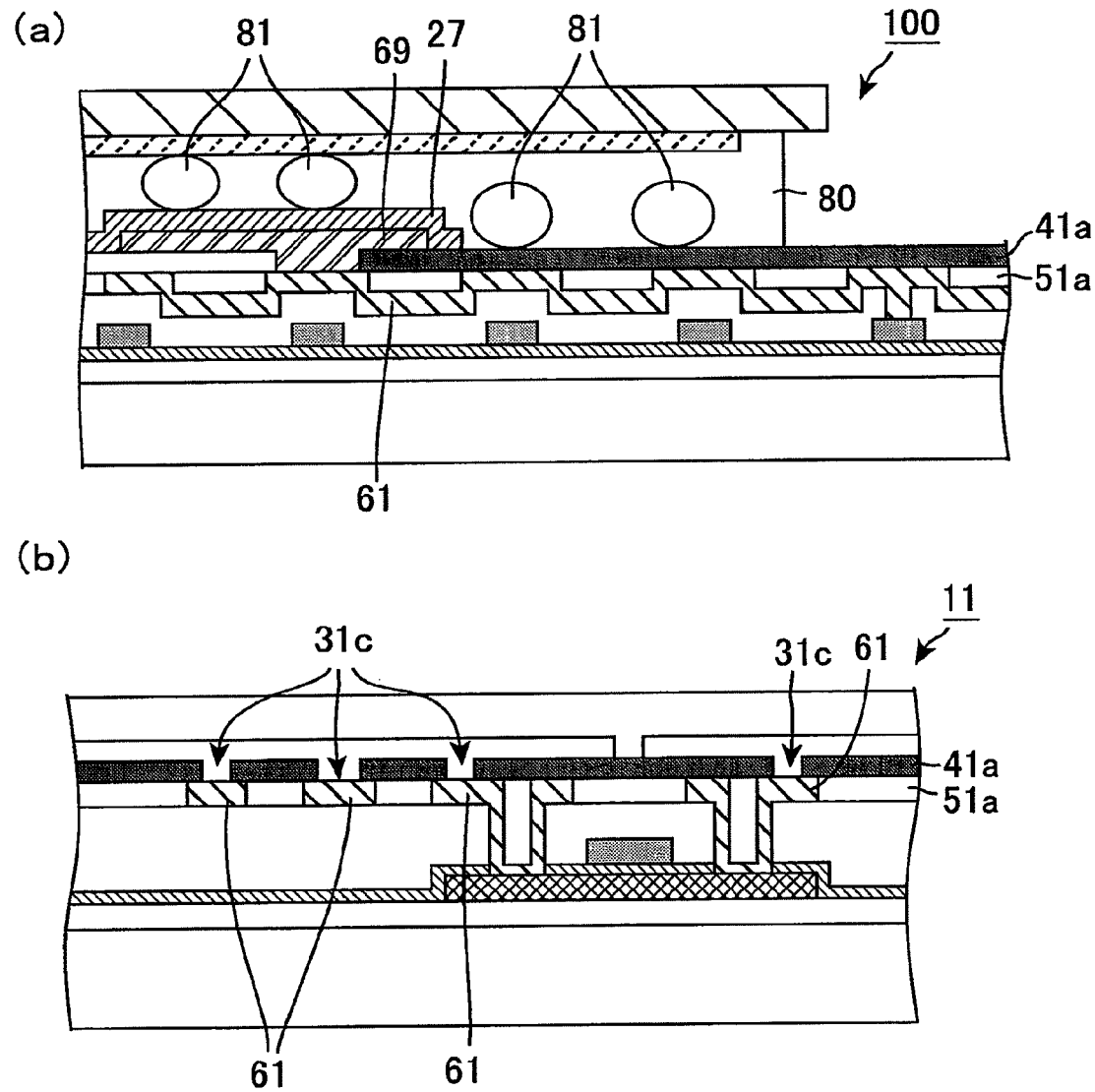
FIG. 21 are cross-sectional views schematically illustrating a liquid crystal display device of still another modified embodiment of Embodiment 1.
Figure 22:
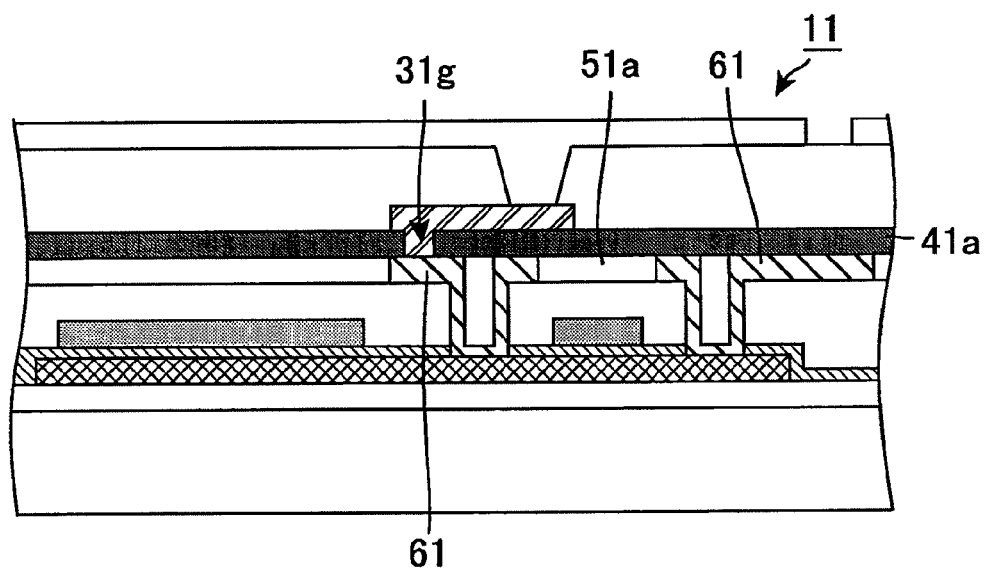
FIG. 22 is a cross-sectional view schematically illustrating a pixel region of the liquid crystal display device of the modified embodiment of Embodiment 1.
Figure 23:
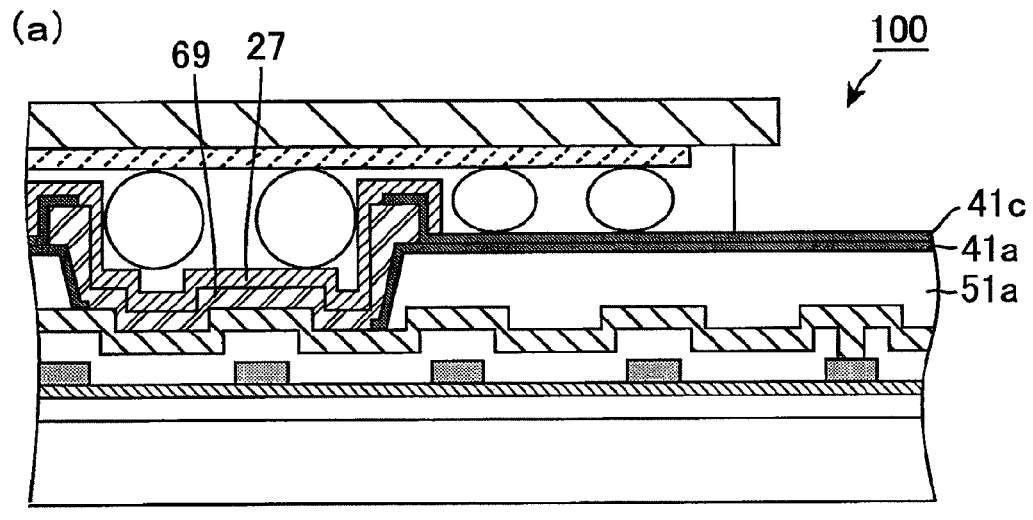
FIG. 23 are cross-sectional views schematically illustrating a liquid crystal display device of still another modified embodiment of Embodiment 1.
Figure 23:
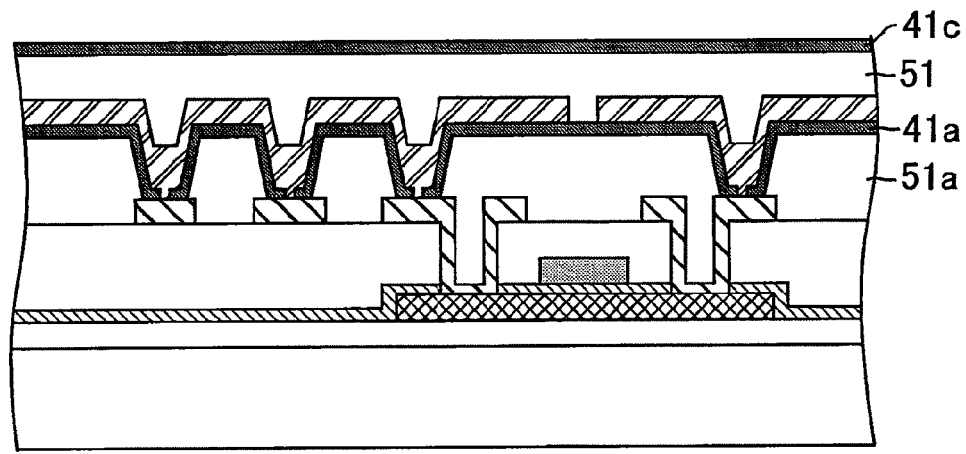
Figure 24:
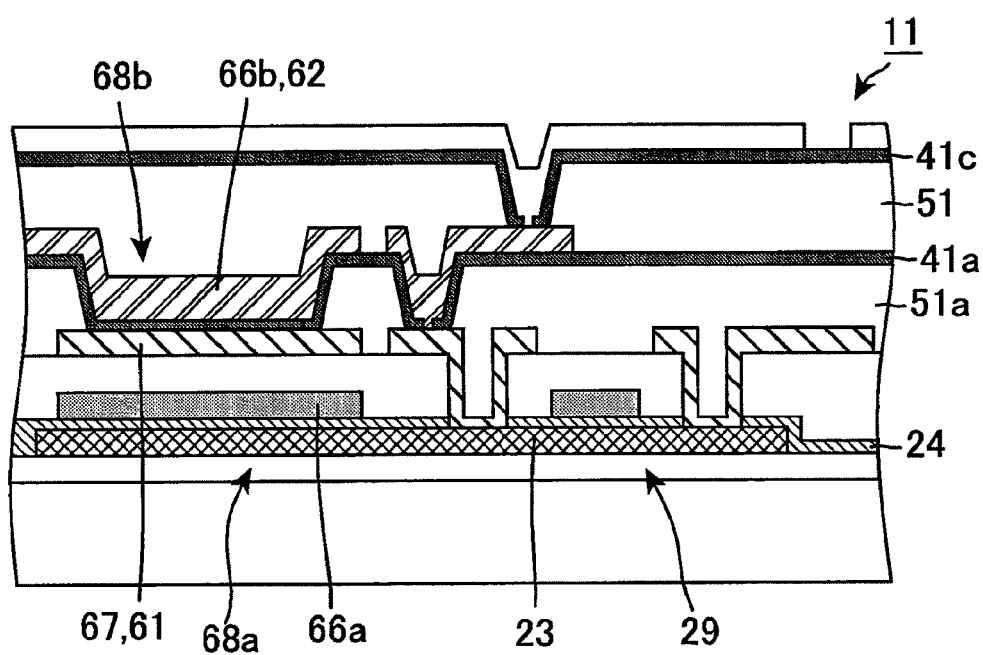
FIG. 24 is a cross-sectional view schematically illustrating a pixel region of the liquid crystal display device of the modified embodiment of Embodiment 1.
Figure 25:
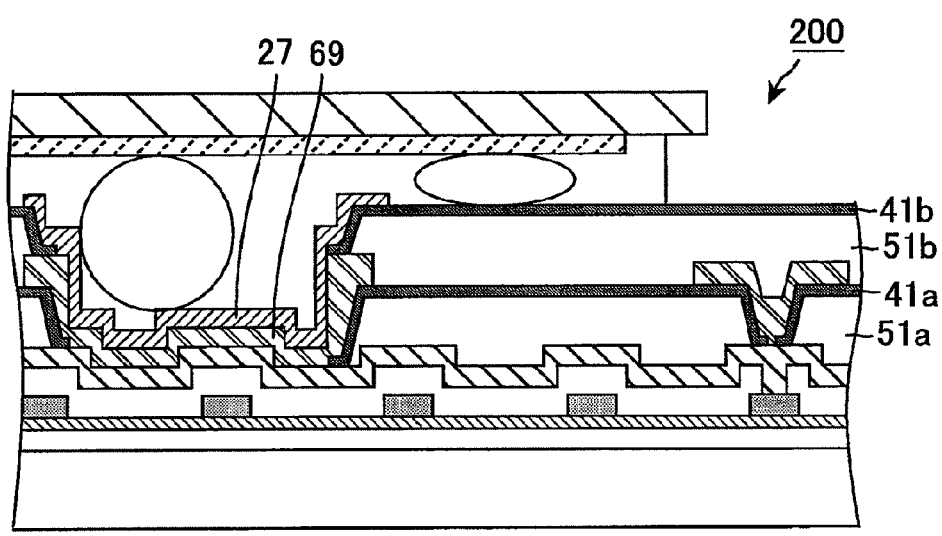
FIG. 25 are cross-sectional views schematically illustrating a liquid crystal display device of a modified embodiment of Embodiment 2.
Figure 25:
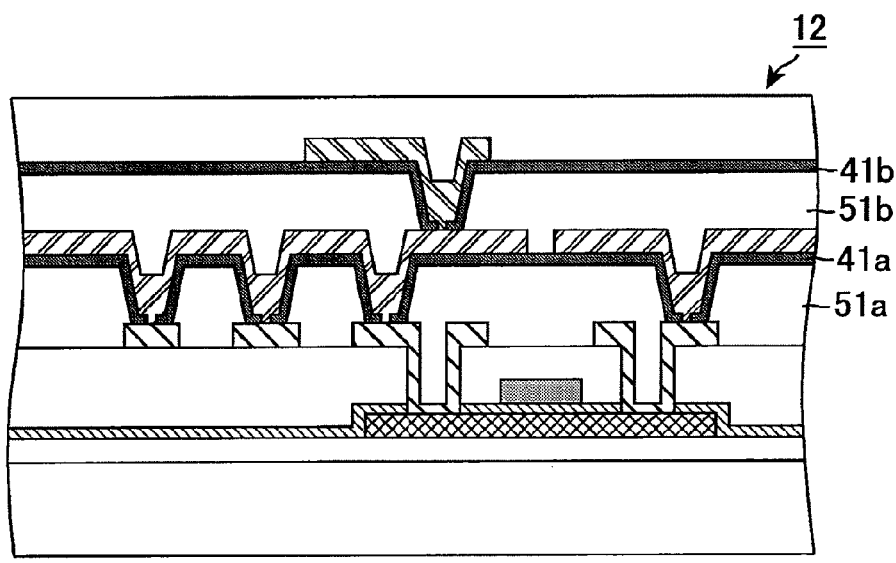
Figure 26:
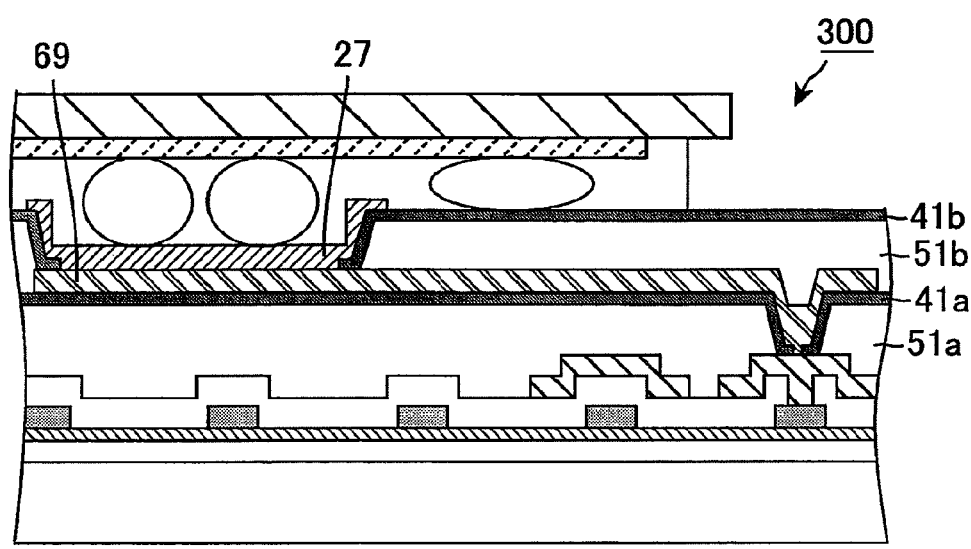
FIG. 26 is a cross-sectional view schematically illustrating a terminal area in a frame region of a liquid crystal display device of a modified embodiment of Embodiment 3.
Figure 27:
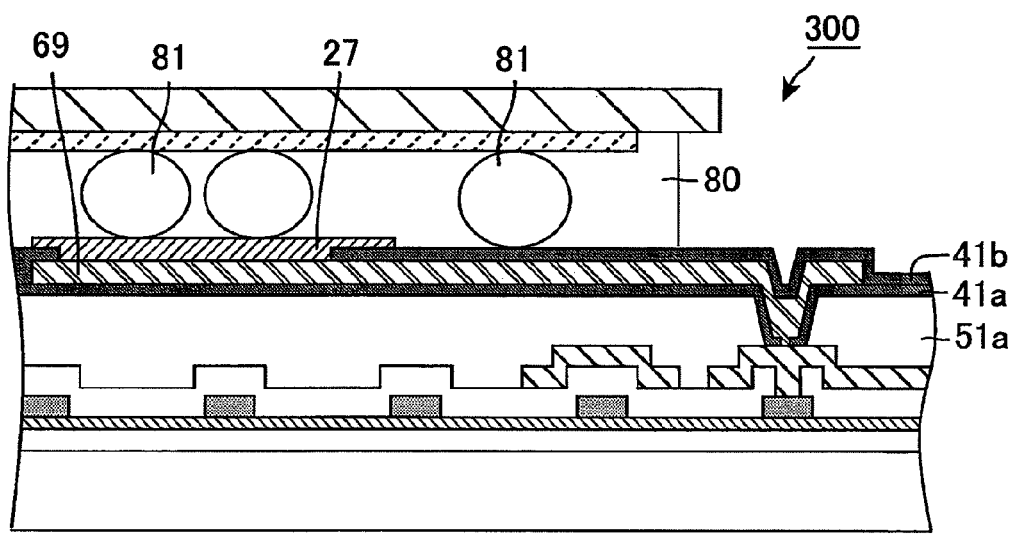
FIG. 27 are cross-sectional views schematically illustrating a liquid crystal display device of another modified embodiment of Embodiment 3.
Figure 27:
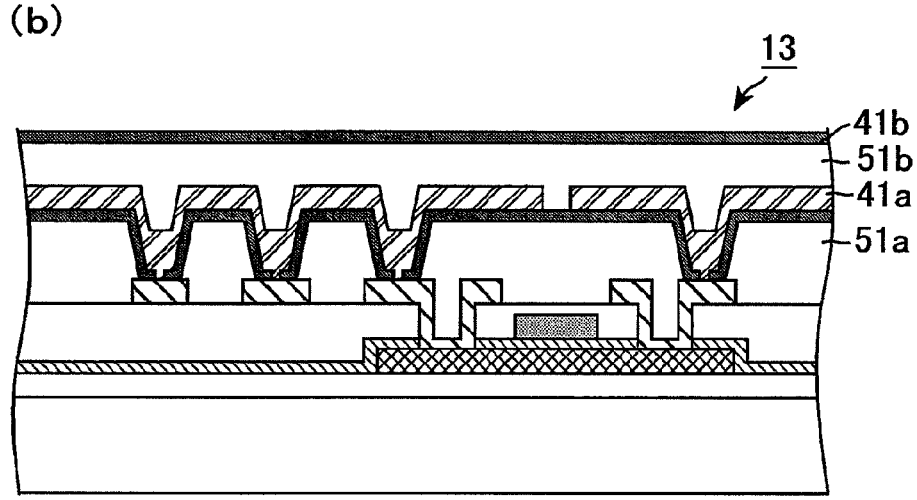
Figure 28:
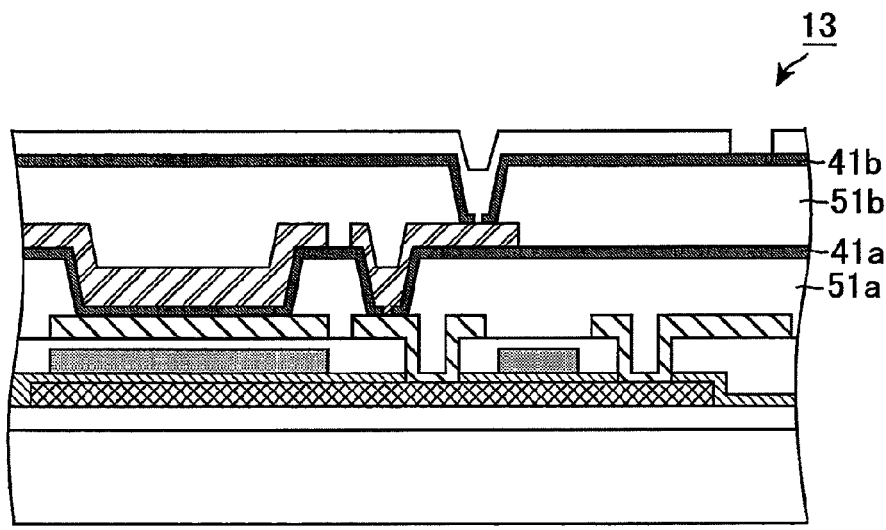
FIG. 28 is a cross-sectional view schematically illustrating a pixel region of the liquid crystal display device of the modified embodiment of Embodiment 3.
Figure 29:
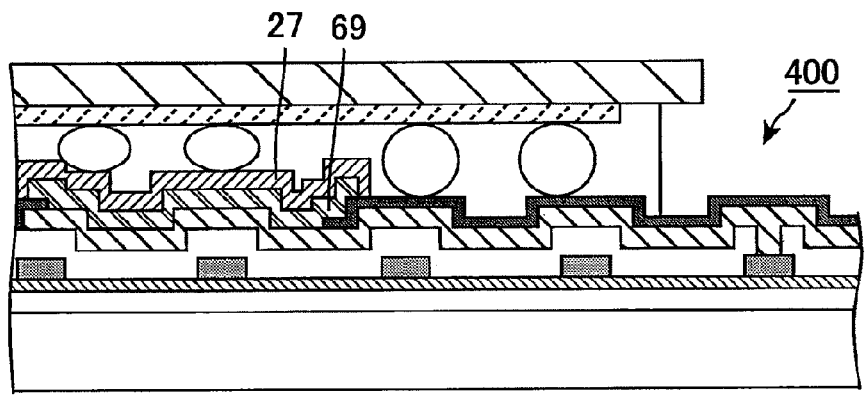
FIG. 29 is a cross-sectional view schematically illustrating a terminal area in a frame region of a liquid crystal display device of another modified embodiment of Embodiment 4.

Explanation Of Numerals And Symbols 11, 12, 13, 14: TFT Substrate
21: Insulating Substrate
22: Base Coat Film
23: Semiconductor Layer
24: Gate Insulating Film
25: Gate Electrode (Gate Line)
26: Connection Terminal (External Connection Terminal)
27: Pad
28: Source/Drain Electrode
29: TFT
30a, 30b, 30c, 30d, 30e: Extending Line
31a, 31b, 31c, 31d, 31e, 31f, 31g, 31j: Contact Hole
32a, 32b, 32c, 32d: Photomask
33a, 33b, 33c: Resist
34: Source Electrode
35: Drain Electrode
36: Pixel Electrode
41, 41a, 41b, 41c: Inorganic Insulating film
51, 51a, 51b: Organic Insulating film
61: First Wiring Layer
62: Second Wiring Layer
63: Third Wiring Layer
65: Drain Line
66a, 66b: Storage Capacitor Upper Electrode
67: Storage Capacitor Lower Electrode
68a, 68b: Pixel Storage Capacitor
69: Most-Proximate Lower Wiring Layer
70: FPC Board
71: Connection Terminal
80: ACF
81: Conductive Fine Particle
100, 200, 300, 400, 500: Liquid Crystal Display Device

The invention claimed is:

1. A display device substrate comprising an insulating substrate, comprising:
at least one of a terminal area having a connection terminal to be connected to an external connection component, and
a peripheral circuit region having a peripheral circuit formed thereon, on the insulating substrate,
said display device substrate comprising:
a plurality of organic-inorganic film stacked bodies stacked on top of each other;
a first wiring; and
a second wiring,
wherein each said organic-inorganic film stacked body is formed of an inorganic insulating film that is stacked directly on and above an organic insulating film,
a lowermost organic-inorganic film stacked body of said plurality of organic-inorganic film stacked bodies is stacked on said first wiring,
said second wiring is stacked on said lowermost organic-inorganic film stacked body, and is connected to said first wiring through a contact hole formed in said lowermost organic-inorganic film stacked body, and
at least a portion of a wall surface of a hole in said organic insulating film is covered with said inorganic insulating film in said contact hole.

2. The display device substrate according to claim 1, comprising:
said terminal area; and
said peripheral circuit region.

3. The display device substrate according to claim 1,
wherein said terminal area comprises said organic-inorganic film stacked body.

4. The display device substrate according to claim 1,
wherein said peripheral circuit region comprises said organic-inorganic film stacked body.

5. The display device substrate according to claim 1,
wherein said terminal area comprises said plurality of the organic-inorganic film stacked bodies.

6. The display device substrate according to claim 1, further comprising a plurality of wiring layers between said plurality of the organic-inorganic film stacked bodies,
wherein said connection terminal is formed in a wiring layer other than a wiring layer closest to said insulating substrate among said plurality of wiring layers.

7. The display device substrate according to claim 1, comprising a plurality of wiring layers between said plurality of the organic-inorganic film stacked bodies, wherein said connection terminal is formed in a wiring layer located uppermost among said plurality of wiring layers.

8. The display device substrate according to claim 1, wherein said peripheral circuit region comprises said plurality of the organic-inorganic film stacked bodies.

9. The display device substrate according to claim 1, wherein said terminal area comprises a portion in which said inorganic insulating film is deposited directly on and above said connection terminal.

10. The display device substrate according to claim 1, wherein said terminal area is free from said organic insulating film.

11. The display device substrate according to claim 1, wherein said organic insulating film has a hole covered with a wiring layer at an upper level than said inorganic insulating film.

12. The display device substrate according to claim 1, wherein said organic insulating film comprises a photosensitive resin.

13. A method for producing the display device substrate according to claim 12, the production method comprising the successive steps of:
   an organic insulating film etching step of etching said organic insulating film comprising said photosensitive resin;
   an inorganic insulating film formation step of forming said inorganic insulating film; and
   an inorganic insulating film etching step of etching said inorganic insulating film.

14. The method for producing a display device substrate according to claim 13,
   wherein said inorganic insulating film etching step comprises dry-etching said inorganic insulating film through a first resist.

15. The method for producing a display device substrate according to claim 13,
   wherein said inorganic insulating film etching step comprises removing, by etching, a portion overlapping a portion removed by etching said organic insulating film comprising said photosensitive resin.

16. The method for producing a display device substrate according to claim 13, further comprising an organic insulating film light exposure step of exposing said organic insulating film to light through a first photomask before said organic insulating film etching step.

17. The method for producing a display device substrate according to claim 16, further comprising the successive steps of:
   a resist film formation step of forming a second resist on said inorganic insulating film after said inorganic insulating film formation step; and
   a resist light exposure step of exposing said second resist to light through said first photomask.

18. A display device comprising a display device substrate produced by a method for producing the display device substrate according to claim 13.

19. A method for producing the display device substrate according to claim 1, the production method comprising the successive steps of:
   an inorganic insulating film etching step of etching said inorganic insulating film by wet-etching using a resist as a mask;
   a resist removal step of removing said resist; and
   an organic insulating film etching step of etching said organic insulating film using said inorganic insulating film as a mask.

20. A method for producing the display device substrate according to claim 1, the production method comprising the successive steps of:
   an inorganic insulating film etching step of etching said inorganic insulating film by dry-etching using a resist as a mask; and
   a step of performing dry-etching such that said resist is removed by ashing and that said organic insulating film is etched using said inorganic insulating film as a mask.

21. A display device comprising a display device substrate according to claim 1.

22. A multilayer wiring board comprising:
   an insulating substrate;
   a planarizing film-inorganic insulating film stacked body in which an inorganic insulating film is formed directly on and above a planarizing film, on the insulating substrate;
   a first wiring; and
   a second wiring,
   wherein said planarizing film-inorganic insulating film stacked body is stacked on said first wiring,
   said second wiring is stacked on said planarizing film-inorganic insulating film stacked body, and is connected to said first wiring through a contact hole formed in said planarizing film-inorganic insulating film stacked body,
   at least an upper portion of a wall surface of a hole in said planarizing film is covered with said inorganic insulating film in the contact hole, and
   a lower portion of the wall surface of the hole in said planarizing film is not covered with said inorganic insulating film in the contact hole.

23. The multilayer wiring board according to claim 22, wherein said planarizing film is an organic insulating film.

24. The multilayer wiring board according to claim 23, wherein said organic insulating film comprises a photosensitive resin.

25. The multilayer wiring board, according to claim 22, wherein said planarizing film is an inorganic insulating film.

26. The multilayer wiring board, according to claim 22, wherein said hole in said planarizing film is covered with a wiring layer at an upper level than said inorganic insulating film.

27. The multilayer wiring board, according to claim 22, which is used as a display device substrate.

* * * * *